(12) United States Patent
Akagi

(10) Patent No.: US 12,259,666 B2
(45) Date of Patent: Mar. 25, 2025

(54) IMAGE FORMING APPARATUS

(71) Applicant: CANON KABUSHIKI KAISHA, Tokyo (JP)

(72) Inventor: Daisuke Akagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/336,485

(22) Filed: Jun. 16, 2023

(65) Prior Publication Data

US 2023/0324828 A1 Oct. 12, 2023

Related U.S. Application Data

(63) Continuation of application No. PCT/JP2021/030057, filed on Aug. 17, 2021.

(30) Foreign Application Priority Data

Dec. 18, 2020 (JP) .................. 2020-210270

(51) Int. Cl.
*G03G 15/043* (2006.01)
*G03G 15/04* (2006.01)

(52) U.S. Cl.
CPC ..... *G03G 15/043* (2013.01); *G03G 15/04054* (2013.01); *G03G 2215/0407* (2013.01)

(58) Field of Classification Search
CPC ....... G03G 15/04036; G03G 15/04045; G03G 15/04054; G03G 2215/0407; G03G 2215/0409; H04N 1/024–036; B41J 2/45
See application file for complete search history.

(56) References Cited

U.S. PATENT DOCUMENTS 5,946,022 A * 8/1999 Kamimura .................. B41J 2/45
347/237
7,660,022 B2 2/2010 Uematsu
(Continued)

FOREIGN PATENT DOCUMENTS

JP 2002-292922 A 10/2002
JP 2007-190786 A 8/2007
(Continued)

OTHER PUBLICATIONS

International Search Report and Written Opinion dated Oct. 19, 2021, in International Application No. PCT/JP2021/030057.
(Continued)

*Primary Examiner* — Carla J Therrien
(74) *Attorney, Agent, or Firm* — Venable LLP

(57) ABSTRACT

An image forming apparatus includes an exposure head including a light emitting portion that includes a first electrode layer including a plurality of electrodes that are two-dimensionally arranged in a rotation direction and a rotational axis direction of a photosensitive member, a light emitting layer stacked on the first electrode layer, and a second electrode layer through which light is transmissible; and a controller configured to control a voltage applied to each of the plurality of electrodes in such a way that one pixel is formed by controlling the voltage applied to the plurality of electrodes arranged at different positions in the rotation direction, in which the plurality of electrodes are arranged in such a way that a pitch of the plurality of electrodes included in the first electrode layer in the rotation direction is an integer multiple of a resolution of an image formed by the image forming apparatus in the rotation direction, and the integer is greater than one.

9 Claims, 19 Drawing Sheets

(56) References Cited

U.S. PATENT DOCUMENTS

| | | | |
|---|---|---|---|
| 2002/0140918 A1 | 10/2002 | Nakamura | |
| 2006/0050134 A1* | 3/2006 | Kobayashi | B41J 2/451 347/130 |
| 2007/0166077 A1 | 7/2007 | Inoue et al. | |
| 2009/0003882 A1* | 1/2009 | Nakamura | B41J 2/45 313/504 |
| 2009/0103947 A1 | 4/2009 | Inoue et al. | |
| 2009/0225150 A1 | 9/2009 | Ebisawa et al. | |
| 2010/0013902 A1 | 1/2010 | Seo | |
| 2019/0384205 A1 | 12/2019 | Furuta | |

FOREIGN PATENT DOCUMENTS

| | | |
|---|---|---|
| JP | 2009-113472 A | 5/2009 |
| JP | 2009-208359 A | 9/2009 |
| JP | 2018-134820 A | 8/2018 |
| KR | 2006-0082403 A | 7/2006 |

OTHER PUBLICATIONS

Office Action dated Oct. 15, 2024, in Japanese Patent Application No. 2020-210270.
Extended European Search Report dated Feb. 5, 2025, in European Patent Application No. 21906053.0.

* cited by examiner

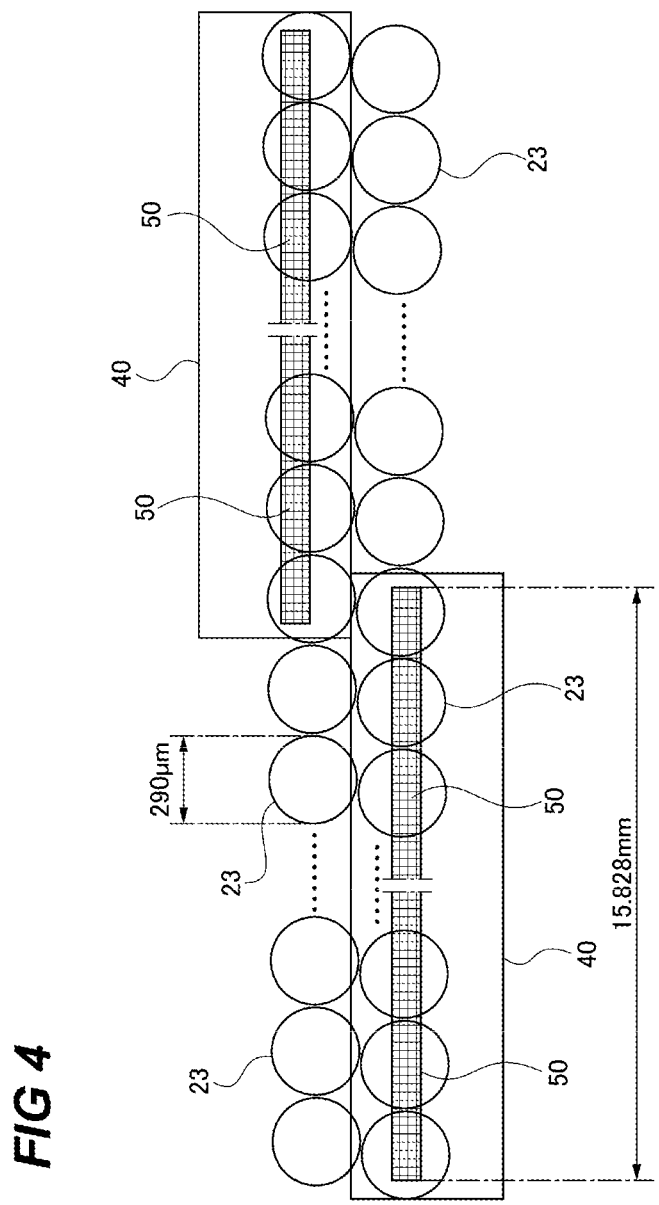

IMAGE FORMING APPARATUS

CROSS-REFERENCE TO RELATED APPLICATIONS

This application is a Continuation of International Patent Application No. PCT/JP2021/030057, filed Aug. 17, 2021, which claims the benefit of Japanese Patent Application No. 2020-210270, filed Dec. 18, 2020, both of which are hereby incorporated by reference herein in their entirety.

BACKGROUND OF THE INVENTION

Field of the Invention

The present invention relates to an image forming apparatus such as an electrophotographic copying machine or an electrophotographic printer that forms an image on a sheet by using an electrophotographic image forming system.

Description of the Related Art

In a case where an image is formed by an image forming apparatus of an electrophotographic system, first, an electrostatic latent image is formed on the surface of a photosensitive member by irradiating the surface of the photosensitive member with light according to image data. Thereafter, toner is attached to the electrostatic latent image on the surface of the photosensitive member by a development device to form a toner image, the toner image is transferred to a sheet, and the toner image transferred to the sheet is heated by a fixing device and fixed to the sheet to form an image.

Here, Japanese Patent Laid-Open No. 2018-134820 discloses an image forming apparatus which is an apparatus that forms an electrostatic latent image by irradiating a photosensitive member with light, the image forming apparatus including an exposure head that includes a light emitting portion using an organic EL and a lens that forms an image of light emitted from the light emitting portion on the surface of the photosensitive member. By using the exposure head in this manner, it is possible to reduce the number of components as compared with a configuration of a laser scanning system in which deflection scanning of laser light is performed using a rotating polygon mirror to form an electrostatic latent image, and it is possible to reduce the size and manufacturing cost of the image forming apparatus.

In addition, it cannot be said that a light quantity of one light emitting portion using the organic EL in the exposure head is sufficiently high. Therefore, Japanese Patent Laid-Open No. 2018-134820 describes a configuration in which a plurality of light emitting portions irradiate the same portion of the surface of the photosensitive member with light in order to supplement the light quantity for forming an electrostatic latent image on the surface of the photosensitive member. Specifically, in the exposure head, the light emitting portions are two-dimensionally arranged in a rotational axis direction (main scanning direction) and a rotation direction (sub-scanning direction) of the photosensitive member. Then, the light emitting portions adjacent to each other in the rotation direction of the photosensitive member are caused to emit light at different timings according to a rotation speed of the photosensitive member, so that the plurality of light emitting portions irradiate the same portion of the surface of the photosensitive member with light. Hereinafter, irradiating the same portion of the surface of the photosensitive member with light by the plurality of light emitting portions in this manner is referred to as multiple exposure.

Japanese Patent Laid-Open No. 2018-134820 does not mention a relationship between a resolution of the image formed by the image forming apparatus in the sub-scanning direction and a pitch of the light emitting portions of the exposure head in the sub-scanning direction. Therefore, depending on the relationship between the resolution and the pitch, it is necessary to provide a delay circuit in a circuit that drives the light emitting portions in order to shift the light emission timings of the light emitting portions adjacent in the sub-scanning direction at the time of multiple exposure, which may increase the size of the circuit.

SUMMARY OF THE INVENTION

An object of the present invention is to provide an image forming apparatus capable of performing multiple exposure by an exposure head without using a delay circuit.

A representative configuration of the present invention is an image forming apparatus configured to expose a surface of a photosensitive member with light to form an electrostatic latent image, and attach toner to the electrostatic latent image to form an image, the image forming apparatus including: an exposure head configured to expose the surface of the photosensitive member with light to form the electrostatic latent image and including a light emitting portion that includes a substrate, a first electrode layer including a plurality of electrodes that are two-dimensionally arranged in a rotation direction of the photosensitive member and a rotational axis direction of the photosensitive member and are arranged on the substrate at intervals, a light emitting layer stacked on the first electrode layer and configured to emit light when a voltage is applied, and a second electrode layer arranged on a side opposite to a side where the first electrode layer is arranged with respect to the light emitting layer and through which light is transmissible; and a controller configured to control application of a voltage to each of the plurality of electrodes included in the first electrode layer based on image data in such a way that the light emitting layer emits light and configured to control the voltage applied to each of the plurality of electrodes based on the image data in such a way that one pixel is formed by controlling the voltage applied to the plurality of electrodes arranged at different positions in the rotation direction, in which the plurality of electrodes are arranged in such a way that a pitch of the plurality of electrodes included in the first electrode layer in the rotation direction is an integer multiple of a resolution of the image formed by the image forming apparatus in the rotation direction, excluding an equal multiple.

Further features of the present invention will become apparent from the following description of embodiments with reference to the accompanying drawings.

BRIEF DESCRIPTION OF THE DRAWINGS

FIG. 4 is a view illustrating a positional relationship between rod lens arrays and light emitting portions.

DESCRIPTION OF THE EMBODIMENTS

First Embodiment

<Image Forming Apparatus>

Hereinafter, an overall configuration of an image forming apparatus A according to a first embodiment of the present invention will be described together with an operation at the time of image formation with reference to the drawings. Note that the dimensions, materials, shapes, relative arrangements, and the like of components described below are not intended to limit the scope of the present invention unless otherwise specified.

The image forming apparatus A according to the present embodiment is a full-color image forming apparatus in which four color toners of yellow Y, magenta M, cyan C, and black K are transferred to a sheet to form an image. In the following description, although members using the toners of the respective colors are given suffixes of Y, M, C, and K, configurations or operations of the respective members are substantially the same as each other except that the color of the toner used is different, and thus the suffixes are omitted as appropriate unless necessary to distinguish the members from each other.

Figure 1:
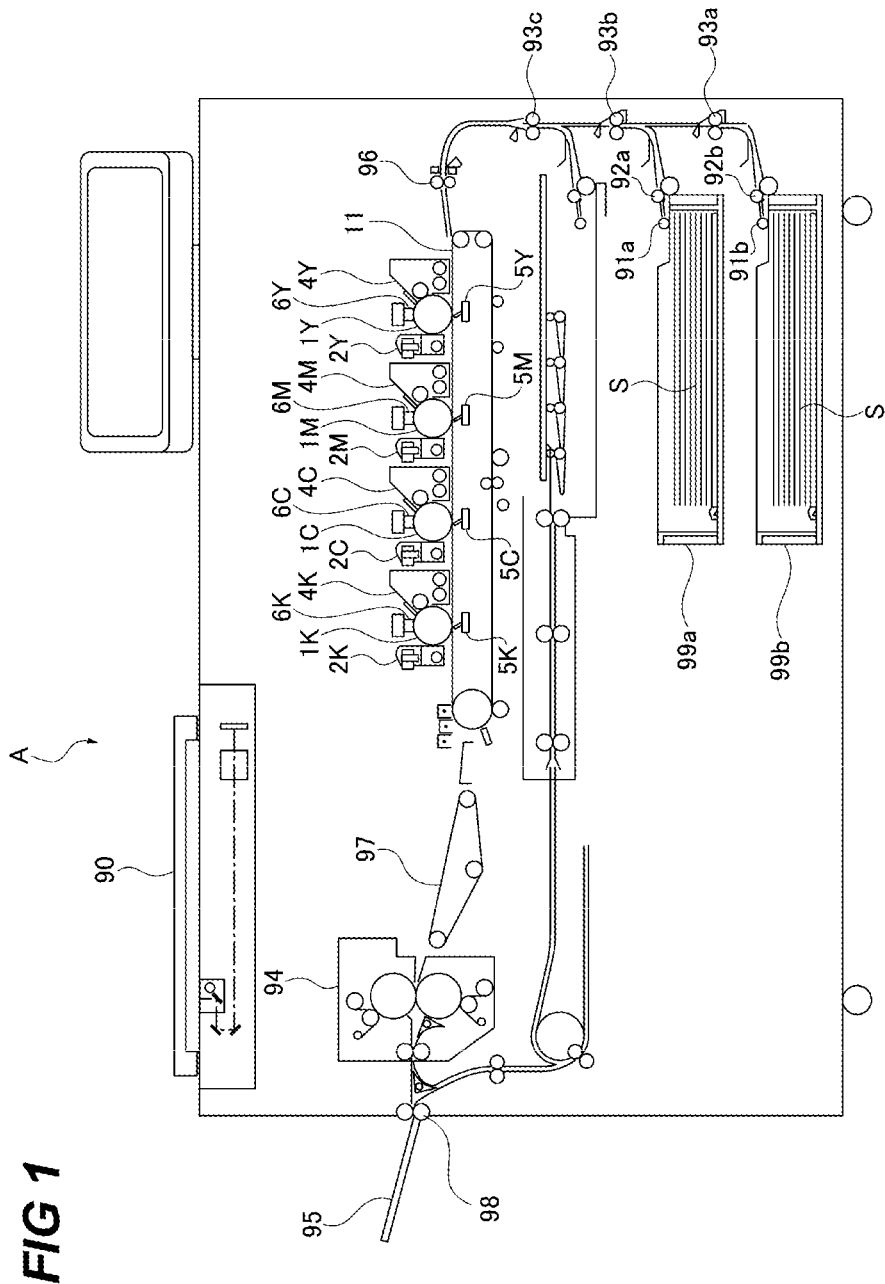
FIG. 1 is a schematic cross-sectional view of an image forming apparatus.

FIG. 1 is a schematic cross-sectional view of the image forming apparatus A. As illustrated in FIG. 1, the image forming apparatus A includes an image forming portion that forms an image. The image forming portion includes photosensitive drums 1 (1Y, 1M, 1C, and 1K) serving as photosensitive members, charging devices 2 (2Y, 2M, 2C, and 2K), exposure heads 6 (6Y, 6M, 6C, and 6K), development devices 4 (4Y, 4M, 4C, and 4K), and transfer devices 5 (5Y, 5M, 5C, and 5K).

Next, an image forming operation performed by the image forming apparatus A will be described. In a case of forming an image, first, a sheet S accommodated in a sheet cassette 99a or a sheet cassette 99b is conveyed to a registration roller 96 by a pickup roller 91a or 91b, a feeding roller 92a or 92b, and conveying rollers 93a to 93c. Thereafter, the sheet S is fed to a conveying belt 11 at a predetermined timing by the registration roller 96.

Meanwhile, in the image forming portion, first, a surface of the photosensitive drum 1Y is charged by the charging device 2Y. Next, the exposure head 6Y irradiates the surface of the photosensitive drum 10Y with light according to image data read by an image reading portion 90 or image data transmitted from an external device (not illustrated), and forms an electrostatic latent image on the surface of the photosensitive drum 10Y. Thereafter, yellow toner is attached to the electrostatic latent image formed on the surface of the photosensitive drum 1Y by the development device 4Y to form a yellow toner image on the surface of the photosensitive drum 1Y. As a transfer bias is applied to the transfer device 5Y, the toner image formed on the surface of the photosensitive drum 1y is transferred to the sheet S that is being conveyed by the conveying belt 11.

By a similar process, the photosensitive drums 1M, 1C, and 1K are also irradiated with light by the exposure heads 6M, 6C, and 6K to form electrostatic latent images, and toner images of magenta, cyan, and black are formed by the development devices 4M, 4C, and 4K. Further, as a transfer bias is applied to the transfer devices 5M, 5C, and 5K, these toner images are overlappingly transferred onto the yellow toner image on the sheet S. As a result, a full-color toner image corresponding to the image data is formed on a surface of the sheet S.

Thereafter, the sheet S carrying the toner image is conveyed to a fixing device 94 by a conveying belt 97, and subjected to heating and pressurization processing in the fixing device 94. As a result, the toner image on the sheet S is fixed to the sheet S. Then, the sheet S to which the toner image is fixed is discharged to a discharge tray 95 by a discharge roller 98.

<Exposure Head>

Next, a configuration of the exposure head 6 will be described.

Figure 2A:
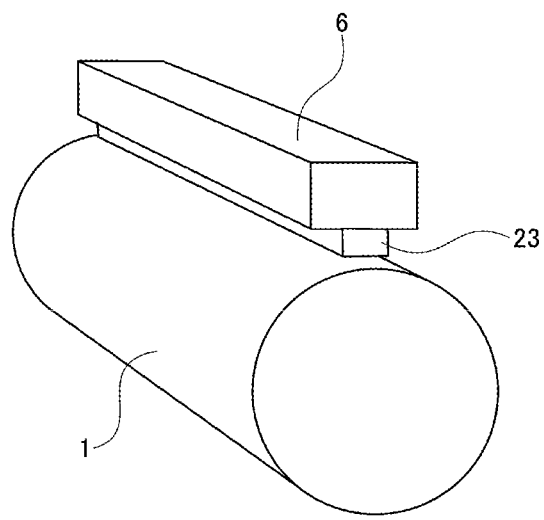
FIGS. 2A and 2B are a perspective view and a cross-sectional view, respectively, of a photosensitive drum and an exposure head.
Figure 2B:
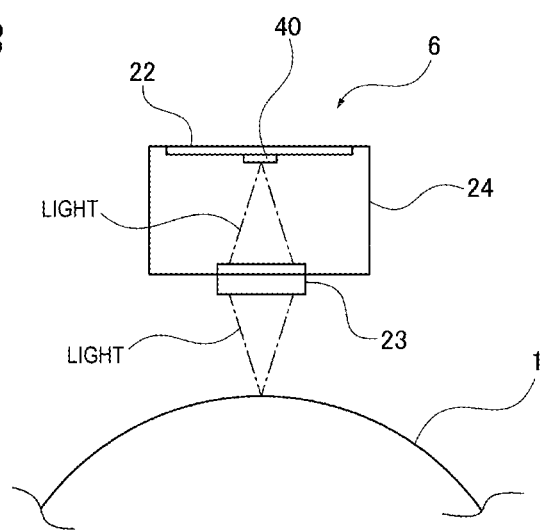
Figure 3A:
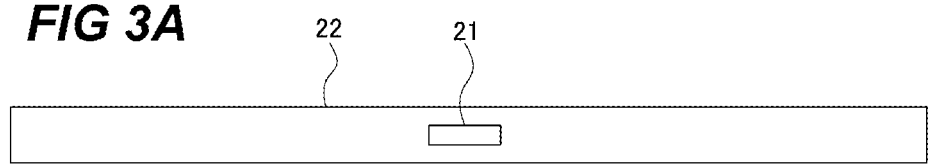
FIGS. 3A to 3C are views illustrating a mounting surface of a printed circuit board included in the exposure head.
Figure 3B:
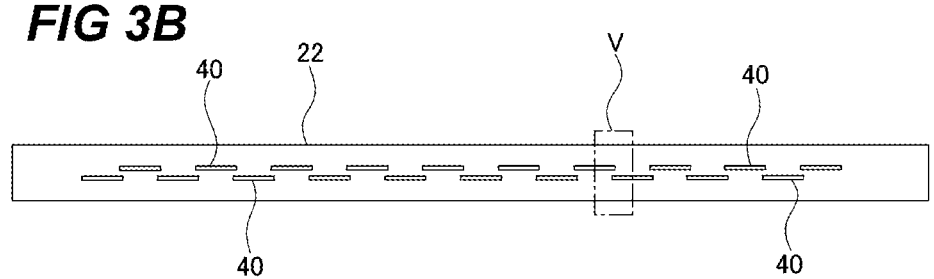
Figure 3C:
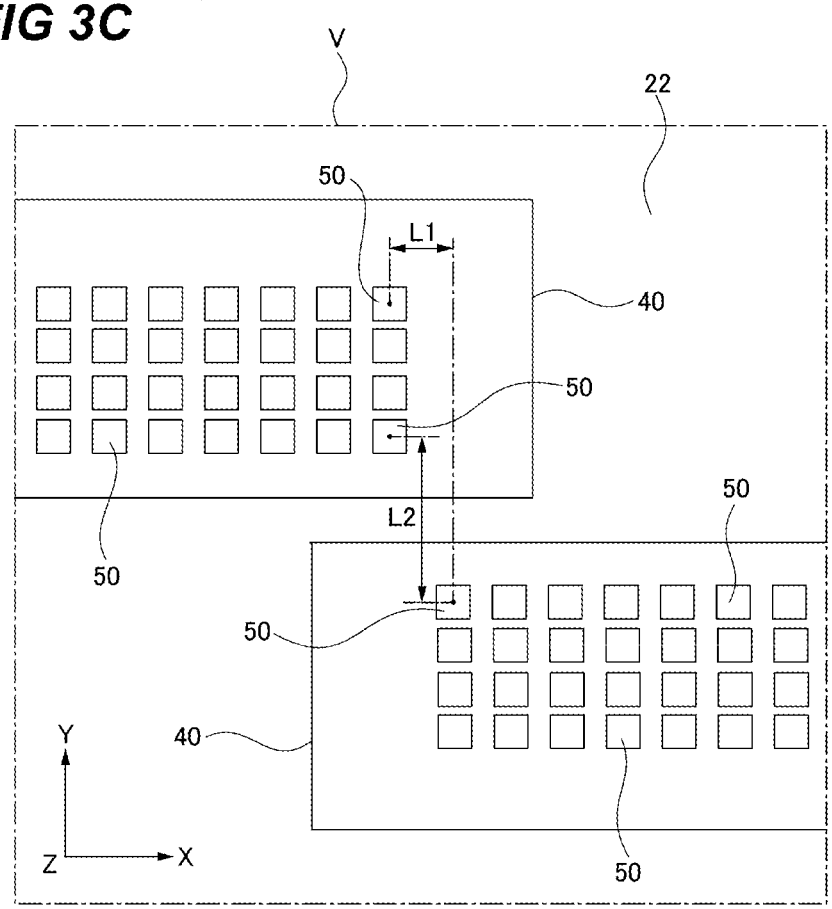

FIG. 2A is a perspective view of the photosensitive drum 1 and the exposure head 6. FIG. 2B is a cross-sectional view of the photosensitive drum 1 and the exposure head 6. FIGS. 3A and 3B are views illustrating mounting surfaces on one side and the other side of a printed circuit board 22 included in the exposure head 6. FIG. 3C is an enlarged view of a region V illustrated in FIG. 3B.

As illustrated in FIGS. 2A and 2B, the exposure head 6 is fixed at a position facing the surface of the photosensitive drum 1 by a fixing member (not illustrated). The exposure head 6 includes a light emitting element array chip 40 that emits light and the printed circuit board 22 on which the light emitting element array chip 40 is mounted. In addition, there are provided a rod lens array 23 that forms an image of (collects) light emitted from the light emitting element array chip 40 on the photosensitive drum 1, and a housing 24 to which the rod lens array 23 and the printed circuit board 22 are fixed.

A connector 21 is mounted on a surface of the printed circuit board 22 that is opposite to a surface on which the light emitting element array chip 40 is mounted. The connector 21 is provided to transmit a control signal for the light emitting element array chip 40 transmitted from an image controller portion 70 (FIG. 8) and to connect a power line. The light emitting element array chip 40 is driven via the connector 21.

As illustrated in FIG. 3A-3C, 20 light emitting element array chips 40 are mounted in a staggered manner in two rows on the printed circuit board 22. In each light emitting element array chip 40, 748 light emitting portions 50 are arranged at a predetermined resolution pitch in a longitudinal direction (arrow X direction). In each light emitting element array chip 40, four light emitting portions 50 are arranged at a predetermined pitch in a lateral direction (arrow Y direction). That is, in each light emitting element array chip 40, the light emitting portions 50 are two-dimensionally arranged in the arrow X direction and the arrow Y direction.

In the present embodiment, the resolution pitch of the light emitting element array chip 40 is 1200 dpi (about 21.16 µm). In addition, a distance from one end portion to the other end portion of the light emitting portions 50 included in each light emitting element array chip 40 in the longitudinal direction is about 15.828 mm. That is, the exposure head 6 includes a total of 14960 light emitting portions 50 in the arrow X direction, which enables exposure processing corresponding to an image width of about 316 mm (≈about 15.8 mm×20 chips) in the longitudinal direction.

In the longitudinal direction of the light emitting element array chip 40, an interval L1 between the light emitting portions 50 of adjacent light emitting element array chips 40 is about 21.16 µm. That is, a pitch of the light emitting portions 50 in the longitudinal direction at a boundary portion of the respective light emitting element array chips 40 is a resolution pitch of 1200 dpi. In addition, in the lateral direction (arrow Y direction) of the light emitting element array chip 40, an interval L2 between the light emitting portions 50 of the adjacent light emitting element array chips 40 is about 127 µm (six pixels at 1200 dpi and four pixels at 800 dpi).

In the present embodiment, the arrow X direction which is the longitudinal direction of the light emitting element array chip 40 is a rotational axis direction of the photosensitive drum 1 and is also a main scanning direction. The arrow Y direction, which is the lateral direction of the light emitting element array chip 40, is a rotation direction of the photosensitive drum 1, and is also a sub-scanning direction. The rotation direction of the photosensitive drum 1 is a tangential direction of the photosensitive drum 1 at an exposure position on the photosensitive drum 1 where light is collected by the exposure head 6. In addition, an arrow Z direction is a stacking direction in which layers of the light emitting portion 50 having a layer structure described below overlap each other. Note that the longitudinal direction of the light emitting element array chip 40 may be inclined by about ±1° with respect to the rotational axis direction of the photosensitive drum 1. The lateral direction of the light emitting element array chip 40 may also be inclined by about ±1° with respect to the rotation direction of the photosensitive drum 1.

FIG. 4 is a view illustrating a positional relationship between the rod lens arrays 23 and the light emitting portions 50 of the light emitting element array chip 40. As illustrated in FIG. 4, a predetermined number of rod lens arrays 23 are arranged in the arrow X direction, and the rod lens arrays 23 are arranged in a staggered manner in two rows in the arrow Y direction in such a way as to cover the light emitting portions 50 of the light emitting element array chip 40. Further, a diameter of the rod lens array 23 is set to 290 um, and light emitted from the plurality of light emitting portions 50 is collected by one rod lens array 23.

<Light Emitting Element Array Chip>

Next, a configuration of the light emitting element array chip 40 will be described.

Figure 5:
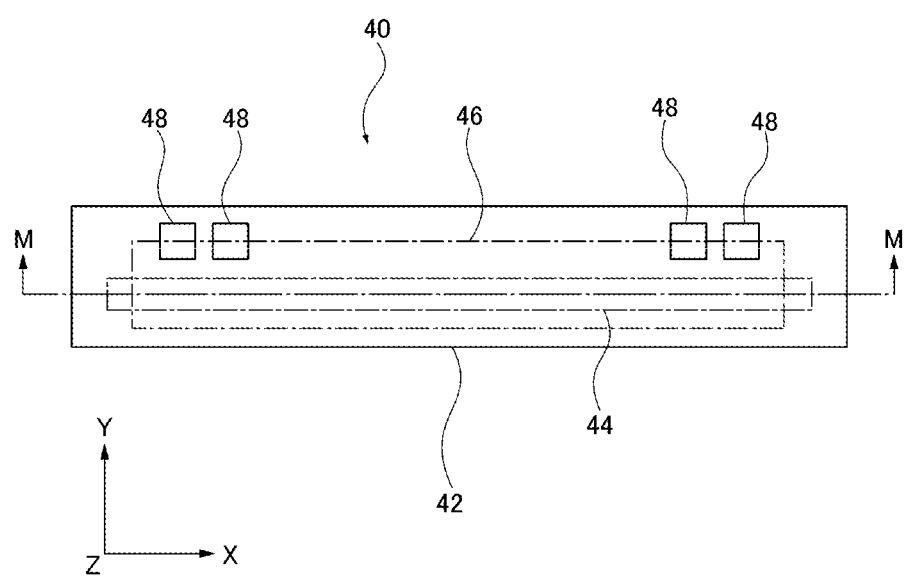
FIG. 5 is a schematic view of a light emitting element array chip.
Figure 6:
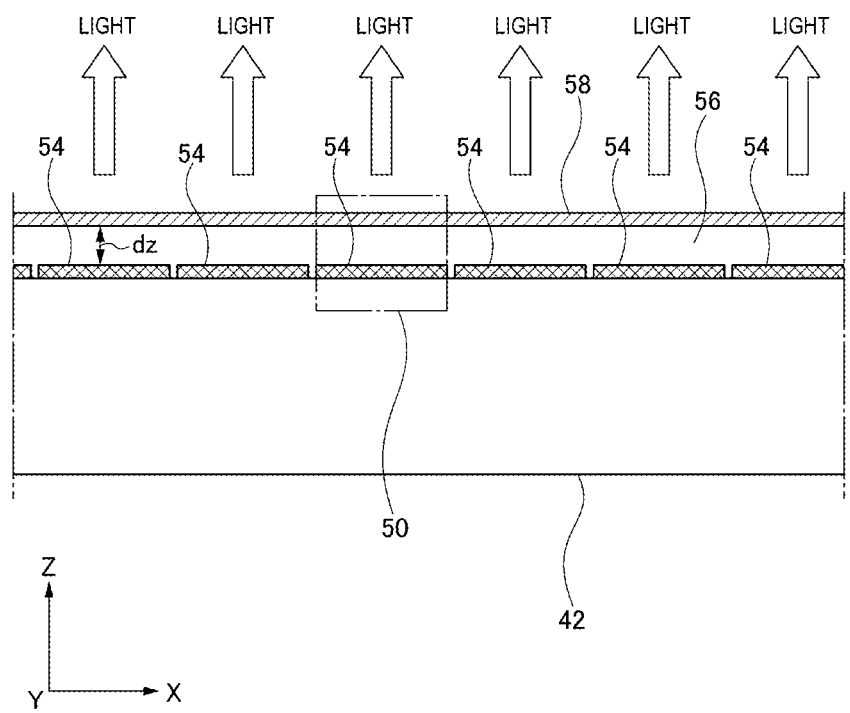
FIG. 6 is a cross-sectional view of the light emitting element array chip.
Figure 7:
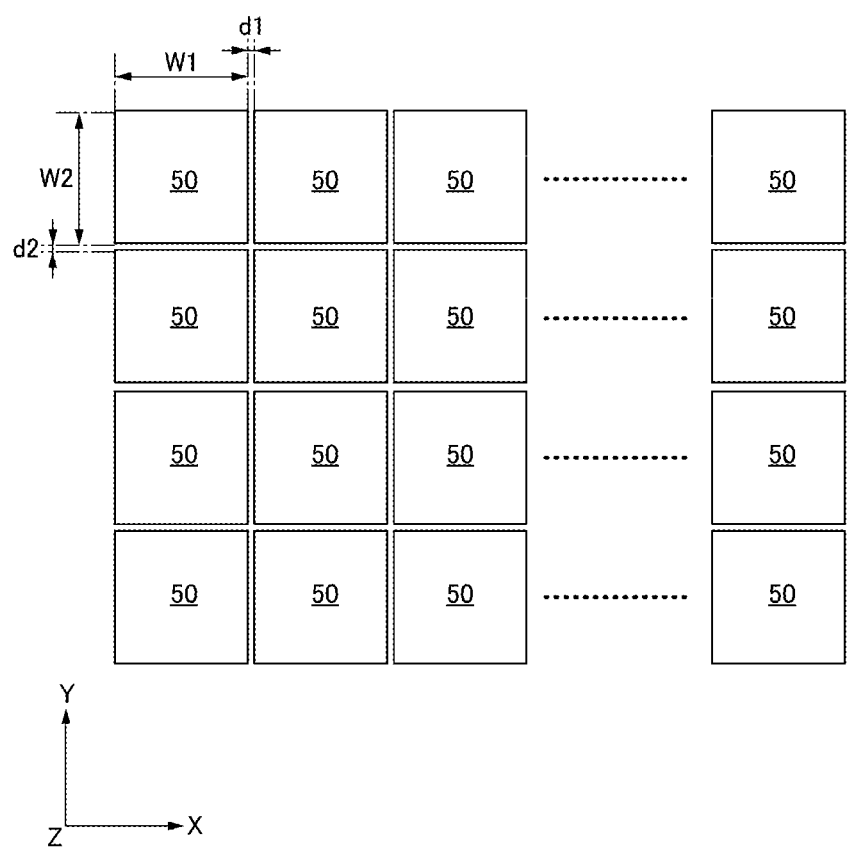
FIG. 7 is a schematic view for explaining arrangement of the light emitting portions.

FIG. 5 is a schematic view of the light emitting element array chip 40. FIG. 6 is a cross-sectional view of the light emitting element array chip 40 taken along line M-M of FIG. 5. FIG. 7 is a schematic view for explaining arrangement of the light emitting portions 50 of the light emitting element array chip 40.

As illustrated in FIG. 5, the light emitting element array chip 40 includes a light emitting substrate 42 (substrate) incorporating a circuit portion 46 for controlling the light emitting portions 50, a light emitting region 44 in which the plurality of light emitting portions 50 are regularly arranged on the light emitting substrate 42, and a wire bonding pad 48. Input and output of a signal between the outside of the light emitting element array chip 40 and the circuit portion 46 and power supply to the circuit portion 46 are performed through the wire bonding pad 48. Note that the circuit portion 46 can use an analog drive circuit, a digital control circuit, or a circuit including both of them.

As illustrated in FIG. 6, the light emitting portion 50 includes the light emitting substrate 42, a plurality of lower electrodes 54 two-dimensionally arranged at regular intervals (intervals d1 and d2 illustrated in FIG. 7) in the arrow X direction and the arrow Y direction on the light emitting substrate 42, a light emitting layer 56, and an upper electrode 58.

The lower electrodes 54 (a first electrode layer including a plurality of electrodes) are a plurality of electrodes formed in a layer form at intervals on the light emitting substrate 42, and are electrodes provided corresponding to pixels, respectively. That is, each lower electrode 54 is provided to form one pixel.

The upper electrode 58 (second electrode layer) is stacked on the light emitting layer 56 at a position on a side opposite to a side where the lower electrode 54 is arranged with respect to the light emitting layer 56. The upper electrode 58 is an electrode through which light having a light emission wavelength of the light emitting layer 56 can be transmitted (transmissible).

The circuit portion 46 controls a potential of a selected lower electrode 54 based on the control signal generated according to the image data, and generates a potential difference between the selected lower electrode 54 and the upper electrode 58. When the potential difference is generated between the upper electrode 58 as a positive electrode and the lower electrode 54 as a negative electrode, electrons flow into the light emitting layer 56 from the negative electrode, and holes flow into the light emitting layer 56 from the positive electrode. The light emitting layer 56 emits light by recombination of the electrons and the holes in the light emitting layer 56.

Light directed to the upper electrode 58 by light emission of the light emitting layer 56 is transmitted through the upper electrode 58 and emitted. Further, the light directed from the light emitting layer 56 toward the lower electrode 54 is reflected from the lower electrode 54 toward the upper electrode 58, and the reflected light is also transmitted through the upper electrode 58 and emitted. In this manner, the light emitting portion 50 emits light. Note that, although there is a time difference between an emission timing of the light emitted directly from the light emitting layer 56 toward the upper electrode 58 and an emission timing of the light reflected by the lower electrode 54 and emitted from the upper electrode 58, since a layer thickness of the light emitting portion 50 is extremely small, the emission timings can be regarded as almost the same.

Note that, in the present embodiment, the light emitting substrate 42 is a silicon substrate. The upper electrode 58 is preferably transparent to the light emission wavelength of the light emitting layer 56. For example, by using a transparent electrode formed of indium tin oxide (ITO), an opening ratio becomes substantially 100%, and light emitted from the light emitting layer 56 passes through the upper electrode 58 and is emitted as it is. In the present embodiment, the upper electrode 58 is a positive electrode provided in common for the respective lower electrodes 54, but the upper electrode 58 may also be provided individually for each of the lower electrodes 54, or one upper electrode 58 may be provided for a plurality of lower electrodes 54. In a case where a transparent electrode is used as the upper electrode 58, the whole electrode is not necessarily a transparent electrode, and only an opening through which light is emitted may be a transparent electrode, and a portion other than the opening may be an electrode other than the transparent electrode, such as a metal wire.

As the light emitting layer 56, an organic EL film, an inorganic EL layer, or the like is used. In a case where an organic EL film is used as the light emitting layer 56, the light emitting layer 56 may be a stacked structure including functional layers such as an electron transport layer, a hole transport layer, an electron injection layer, a hole injection layer, an electron blocking layer, and a hole blocking layer as necessary. Further, the light emitting layer 56 may be continuously formed in the arrow X direction, or may be divided in the same size as the lower electrode 54. In addition, each of the lower electrodes 54 may be divided into a plurality of groups, and one light emitting layer 56 may be stacked on the lower electrodes 54 belonging to each divided group.

Note that when a light emitting material vulnerable to moisture such as an organic EL layer (organic light emitting layer) or an inorganic EL layer is used as the light emitting layer 56, it is desirable to perform sealing in order to prevent moisture from entering the light emitting region 44. As a sealing method, for example, a single thin film of silicon oxide, silicon nitride, aluminum oxide, or the like or a sealing film in which the thin films are stacked is formed. As a method for forming the sealing film, a method excellent in covering performance for a structure such as a step is preferable, and for example, an atomic layer deposition method (ALD method) or the like can be used. Note that the material, configuration, forming method, and the like of the sealing film are merely examples, and are not limited to the examples described above, and it is sufficient if a suitable material, configuration, forming method, and the like are appropriately selected.

The lower electrode 54 is preferably formed of a metal having a high reflectance with respect to the light emission wavelength of the light emitting layer 56. For example, Ag, Al, or an alloy of Ag and Al is used. The lower electrode 54 is formed by using a Si integrated circuit processing technology together with the formation of the circuit portion 46, and is directly connected to a drive portion of the circuit portion 46. As described above, as the lower electrode 54 is formed by the Si integrated circuit processing technology, the process rule is about 0.2 μm, and high accuracy is obtained, so that the lower electrodes 54 can be accurately and densely arranged. Furthermore, since the lower electrodes 54 can be densely arranged, most of the light emitting region 44 can be caused to emit light, and utilization efficiency of the light emitting region 44 can be enhanced. An organic material of the light emitting layer 56 fills a space between the respective lower electrodes 54, and the respective lower electrodes 54 are partitioned by the organic material.

In addition, when a voltage applied across the light emitting portion 50 becomes a predetermined value or more, a current starts to flow, and thereafter, a value of the current increases substantially in proportion to the value of the voltage. The voltage at which the current starts to flow in each light emitting portion 50 varies. Therefore, before product shipment from the factory, the light emitting portions 50 of the light emitting element array chip 40 are caused to individually and sequentially emit light, and the current flowing through the light emitting portion 50 is adjusted in such a way that light collected through the rod lens array 23 has a predetermined light quantity. Note that the exposure head 6 performs not only the above-described light quantity adjustment but also focus adjustment for adjusting an interval between the light emitting element array chip 40 and the rod lens array 23 before product shipment from the factory.

As illustrated in FIG. 7, the light emitting portions 50 are arranged in a matrix form at predetermined intervals in the arrow X direction and the arrow Y direction in the light emitting region 44. In the present embodiment, a width W1 of the light emitting portion 50 in the arrow X direction is 19.80 μm, and the interval d1 between the light emitting portions 50 adjacent to each other in the arrow X direction is 0.68 μm. That is, the light emitting portions 50 are arranged at a pitch of 21.16 μm (1200 dpi) in the arrow X direction. Note that the pitch of the light emitting portions 50 in the arrow X direction may have a deviation within a tolerance range. The tolerance of the pitch of the light emitting portions 50 in the arrow X direction is ±1% with respect to a design nominal pitch of the light emitting portions 50 in the arrow X direction. That is, the tolerance of the pitch of the light emitting portions 50 in the arrow X direction according to the present embodiment is ±0.21 μm. In addition, the width, shape, arrangement, and the like of the light emitting portion 50 are substantially determined by the width, shape, and arrangement of the lower electrode 54 in the present embodiment, and thus can also be referred to as the width, shape, and arrangement of the lower electrode 54.

A width W2 of the light emitting portion 50 in the arrow Y direction is also 19.80 μm similarly to the width W1. That is, the light emitting portion 50 of the present embodiment has a square shape having one side of 19.80 μm. Although the light emitting portion 50 has a square shape because the width W1 and the width W2 are equal to each other, the widths W1 and W2 may have deviations within a tolerance range. In the present embodiment, the tolerances of the widths W1 and W2 are both ±0.2 μm.

In addition, the interval d2 between the light emitting portions 50 adjacent to each other in the arrow Y direction is also 0.68 μm similarly to the interval d1, and the light emitting portions 50 are arranged at a pitch of 21.16 μm (1200 dpi) also in the arrow Y direction. Note that the pitch of the light emitting portions 50 in the arrow Y direction may have a deviation within a tolerance range. The tolerance of the pitch of the light emitting portions 50 in the arrow Y direction is ±1% with respect to a design nominal pitch of the light emitting portions 50 in the arrow Y direction. That is, the tolerance of the pitch of the light emitting portions 50 in the arrow Y direction according to the present embodiment is ±0.21 μm. Here, the intervals d1 and d2 between the light emitting portions 50 are set to be larger than an interval dz (FIG. 6) between the upper electrode 58 and the lower electrode 54. With such a configuration, a leakage current between the lower electrodes 54 adjacent to each other in the arrow X direction and the arrow Y direction can be suppressed, and erroneous light emission of the light emitting portion 50 can be suppressed.

In the present invention, the shape of the light emitting portion 50 is not limited to a square, and may be a polygon with more sides than a quadrangle, a circle, an ellipse, or the like as long as light having an exposure region size corresponding to an output resolution of the image forming apparatus A is emitted and image quality of an output image satisfies a design specification of the image forming apparatus A. However, since a light quantity of an organic light emitting material is smaller than that of an LED, it is preferable to reduce a distance between adjacent light emitting portions 50 having a square shape because it is possible to secure a light emitting area for obtaining a light quantity enough to change the potential of the photosensitive drum 1. In addition, the number of light emitting portions 50 arranged in parallel in the arrow Y direction is not limited to four as long as two or more light emitting portions 50 are provided, and is determined based on the light quantity necessary for the exposure processing by the exposure head 6, the resolution, or the like.

In addition, the distance between the light emitting portions 50, that is, the distance between the lower electrodes 54 is defined based on design nominal centroid positions of the lower electrodes 54. That is, in a case where the shape of the lower electrode 54 is a regular polygon, the distance between the lower electrodes 54 is set based on intersections of the diagonal lines, in a case where the shape of the lower electrode 54 is a perfect circle, the distance between the lower electrodes 54 is set based on the centers of the circles, and in a case where the shape of the lower electrode 54 is an ellipse, the distance between the lower electrodes 54 is set based on intersections of the major axes and the minor axes. In a case where the shape of the lower electrode 54 is a regular polygon, the corner does not have to be a perfect corner and may be rounded.

<System Configuration of Exposure Head>

Next, a configuration of the exposure head 6 and the image controller portion 70 (controller) that controls the exposure head 6 will be described. The image controller portion 70 is provided on a main body side of the image forming apparatus A. Although control performed when processing one piece of image data (single color) will be described below, similar processing is executed in parallel for four pieces of image data corresponding to yellow, magenta, cyan, and black when the image forming operation is performed.

Figure 8:
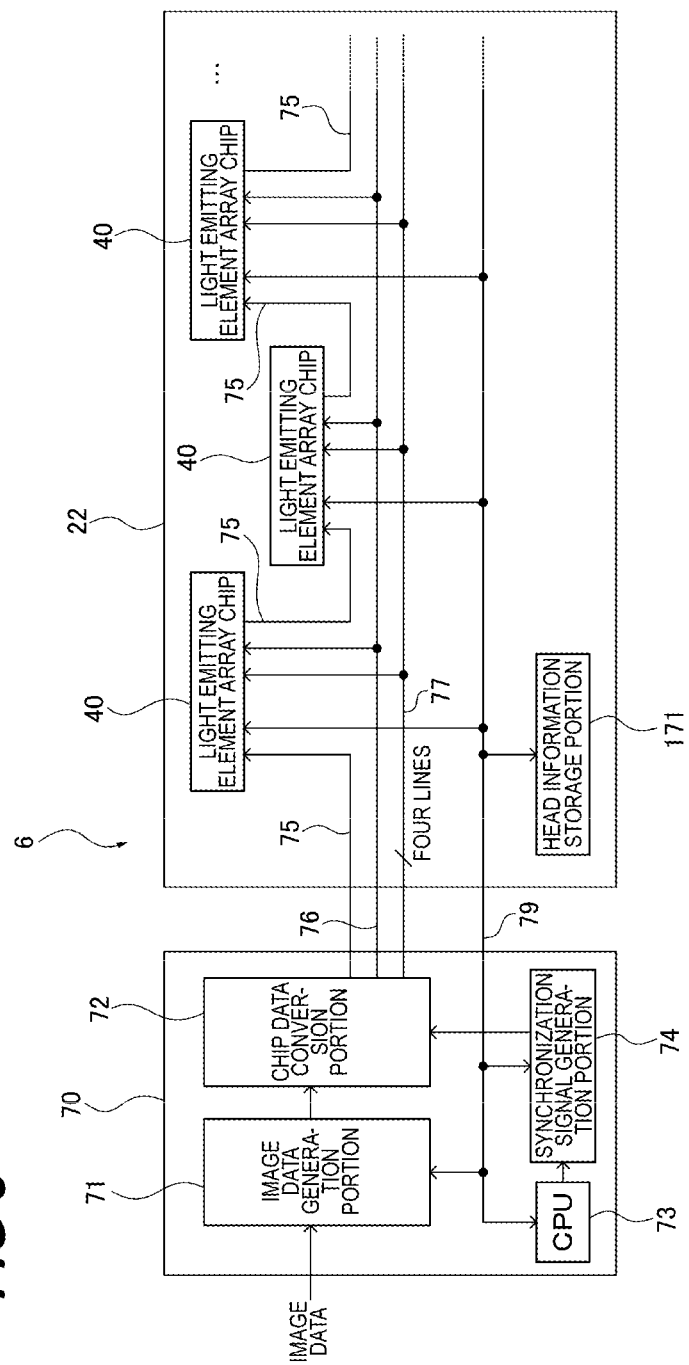
FIG. 8 is a block diagram illustrating a system configuration of an image controller portion and the exposure head.

FIG. 8 is a block diagram illustrating a system configuration of the image controller portion 70 and the exposure head 6. As illustrated in FIG. 8, the image controller portion 70 includes an image data generation portion 71, a chip data conversion portion 72, a CPU 73, and a synchronization signal generation portion 74. The image controller portion 70 executes image data processing and image forming timing processing by these parts, and transmits a control signal for controlling the exposure head 6 to the printed circuit board 22 of the exposure head 6.

Image data of an original read by the image reading portion 90 and image data transferred from an external device via a network are input to the image data generation portion 71. The image data generation portion 71 executes dithering processing on the input image data at a resolution indicated by the CPU 73, and generates image data for outputting an image. In the present embodiment, the dithering processing is executed at a resolution of 2400 dpi in both the main scanning direction and the sub-scanning direction.

The synchronization signal generation portion 74 periodically generates a line synchronization signal (control signal) indicating start of taking-in of image data, and transmits the line synchronization signal to the chip data conversion portion 72. The CPU 73 sets, as one line cycle, a cycle in which the surface of the photosensitive drum 1 moves by a pixel size in the rotation direction at a preset rotation speed of the photosensitive drum 1 according to the resolution of the image formed by the image forming apparatus A in the sub-scanning direction, and indicates, to the synchronization signal generation portion 74, a time interval of a signal cycle.

In the present embodiment, the resolution of the image formed by the image forming apparatus A in the sub-scanning direction is 2400 dpi, and the photosensitive drum 1 rotates at 200 mm/s. Therefore, a time for which the photosensitive drum 1 moves by a distance (about 10.58 µm) of a pixel size of 2400 dpi is 52.92 us, and the cycle of the line synchronization signal is 52.92 us. Note that the rotation speed of the photosensitive drum 1 is calculated by the CPU 73 based on a set value stored in a storage portion (not illustrated).

The chip data conversion portion 72 divides image data of one line×four rows (the number of light emitting portions 50 in the arrow Y direction) into the respective light emitting element array chips 40 in synchronization with the line synchronization signal generated and input by the synchronization signal generation portion 74. Then, the chip data conversion portion 72 transmits the image data together with a clock signal and the line synchronization signal to each light emitting element array chip 40 via a line synchronization signal line 75, a clock signal line 76, and an image data signal line 77. Note that the number of image data signal lines 77 is four, which is the same as the number of light emitting portions 50 in the arrow Y direction.

A head information storage portion 171 included in the exposure head 6 is connected to the CPU 73 via a communication signal line 79. The head information storage portion 171 stores a light emission quantity and mounting position information of each light emitting element array chip 40 as head information. The light emitting element array chip 40 causes the light emitting portion 50 to emit light based on a set value of each of the above-described signals input from the image controller portion 70. In addition, the light emitting element array chip 40 generates a line synchronization signal to be used in another light emitting element array chip 40 connected via the line synchronization signal line 75.

<System Configuration of Light Emitting Element Array Chip>

Next, a system configuration of the light emitting element array chip 40 will be described.

Figure 9:
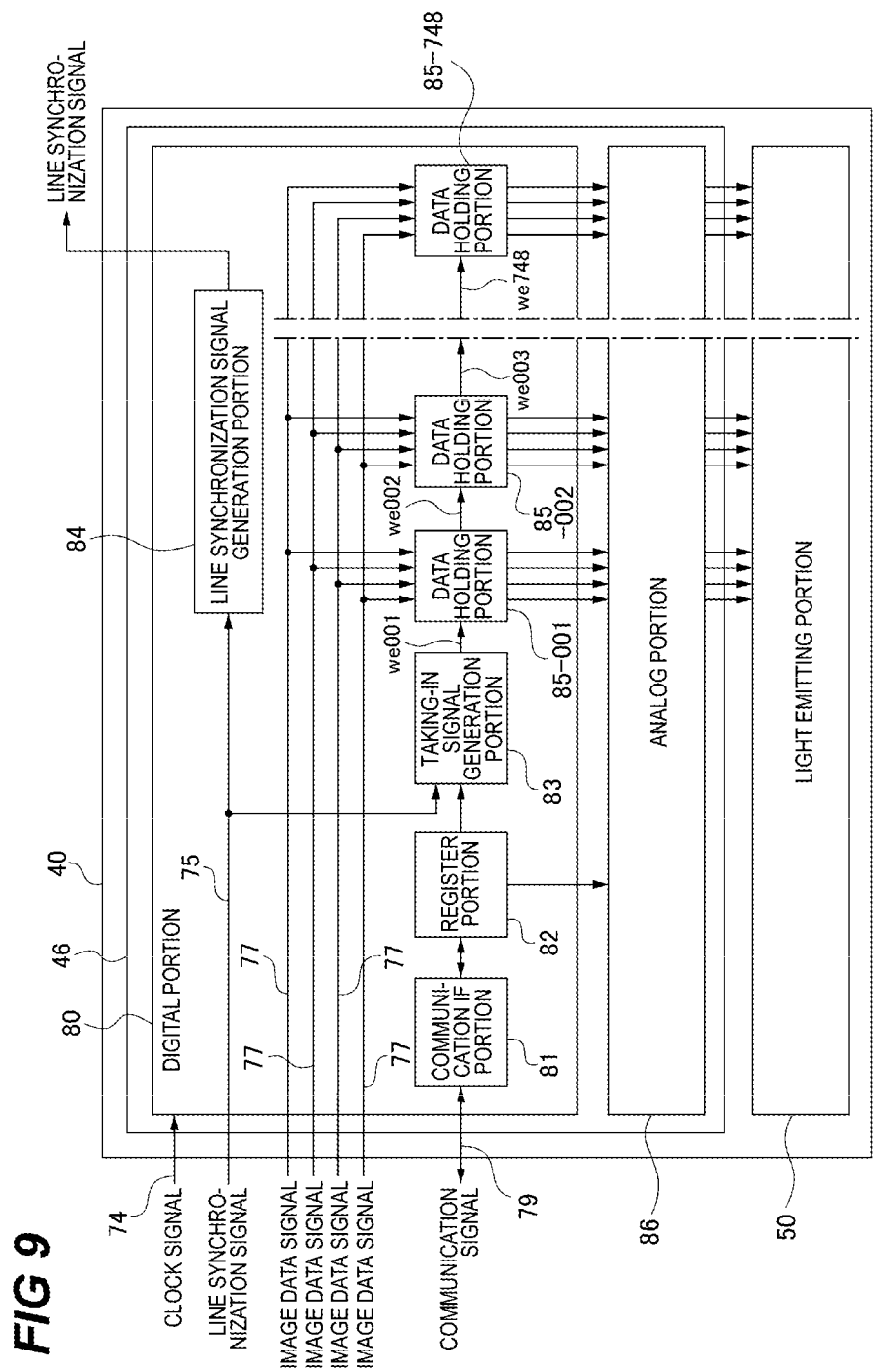
FIG. 9 is a block diagram illustrating a system configuration of the light emitting element array chip.

FIG. 9 is a block diagram illustrating a system configuration of the light emitting element array chip 40. In FIG. 9, since the clock signal is input to all blocks of a digital portion 80, the connection is omitted. As illustrated in FIG. 9, the circuit portion 46 of the light emitting element array chip 40 includes the digital portion 80 and an analog portion 86.

The digital portion 80 includes a communication IF portion 81, a register portion 82, a taking-in signal generation portion 83, a line synchronization signal generation portion 84, and a data holding portion 85. The digital portion 80 generates a pulse signal for causing the light emitting portion 50 to emit light based on the set value set in advance by a communication signal in synchronization with the clock signal, an image data signal, and the line synchronization signal by these parts, and transmits the pulse signal to the analog portion 86. Note that 748 light emitting portions 50 are provided as the data holding portions 85, 748 (85-001 to 85-748) being the number of light emitting portions 50 included in one light emitting element array chip 40 in the arrow X direction.

The line synchronization signal generation portion 84 delays the input line synchronization signal by a predetermined time, and generates a line synchronization signal to be used in another light emitting element array chip 40 connected via the line synchronization signal line 75. The taking-in signal generation portion 83 outputs a data latch signal we001 to the data holding portion 85-001 at a timing delayed from the input line synchronization signal by a predetermined set time input from the register portion 82.

The register portion 82 stores information regarding the delay time of the taking-in signal generation portion 83 described above, setting information of a drive current set by the analog portion 86, and the like. The communication IF portion 81 controls writing and reading of the set value to and from the register portion 82 based on the communication signal input from the CPU 73.

<Data Holding Portion>

Next, a configuration of the data holding portion 85 will be described.

Figure 10:
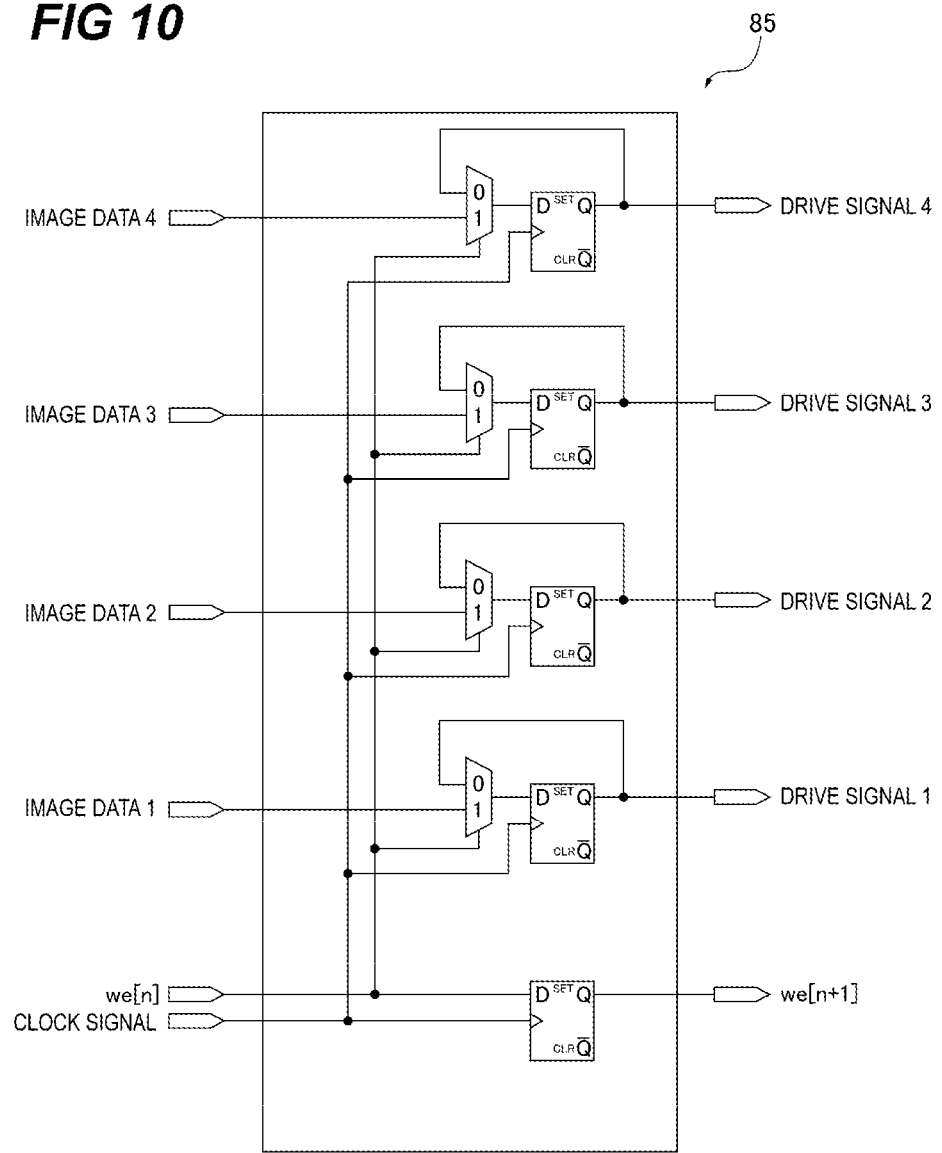
FIG. 10 is a circuit diagram of a data holding portion.

FIG. 10 is a circuit diagram of the data holding portion 85. As illustrated in FIG. 10, pieces of image data (image data 1 to 4) for four lines, a clock signal, and a data latch signal wen (n=1 to 748) are input to the data holding portion 85. Each data holding portion 85 includes four flip-flop circuits and four gate circuits for latching the pieces of image for four lines simultaneously input at a timing when the data latch signal is input. Each data holding portion 85 includes one flip-flop circuit for delaying by one clock pulse and outputting the data latch signal.

Figure 11:
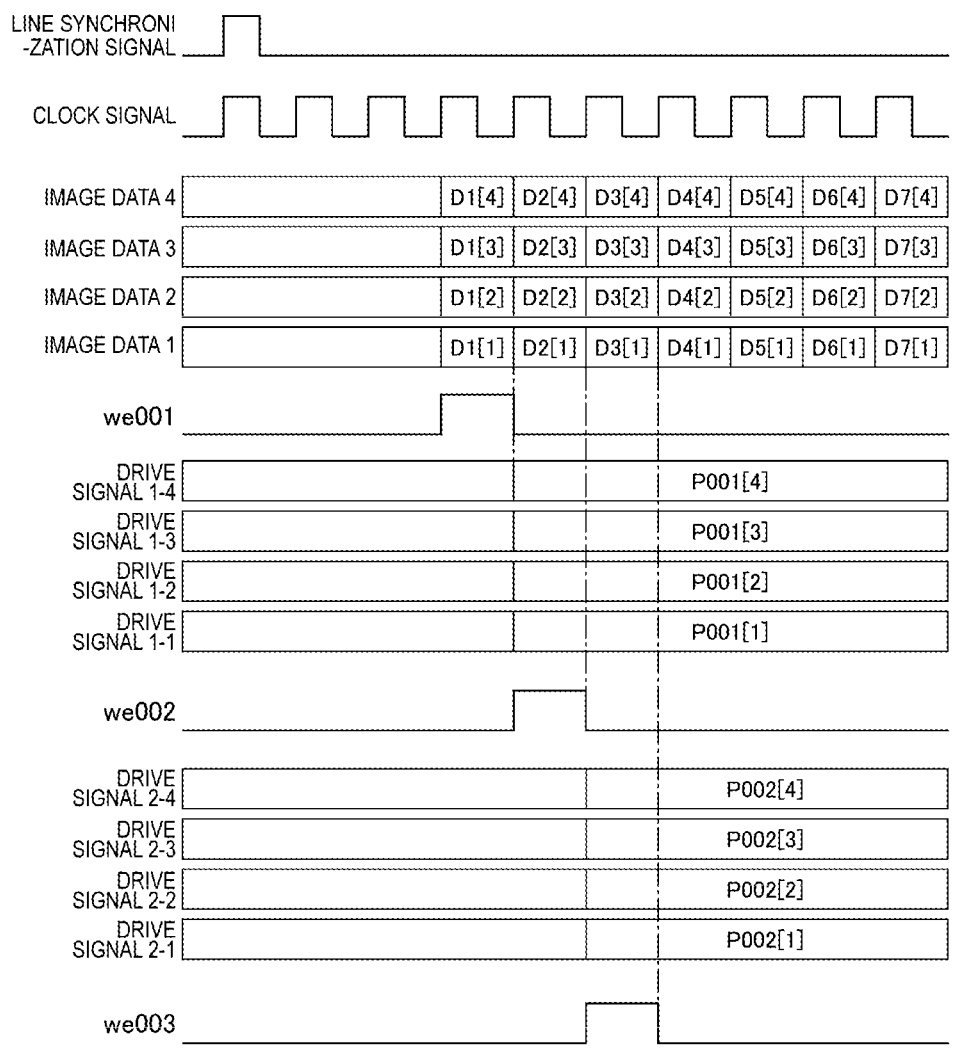
FIG. 11 is an operation timing chart of the data holding portion.

FIG. 11 is an operation timing chart of the data holding portion 85. As illustrated in FIG. 11, pieces of image data (D1[1] to D1[4]) for four lines are simultaneously input to the data holding portion 85-001. The data holding portion 85-001 latches the pieces of image data at a timing when a data latch signal we001 is input from the taking-in signal generation portion 83, and generates drive signals (P001[1] to P001[4]). In addition, the data holding portion 85-001 delays the input data latch signal we001 by one clock pulse and transmits the delayed data latch signal to the next data holding portion 85-002 as a data latch signal we002.

Pieces of image data (D2[1] to D2[4]) for four lines are simultaneously input to the data holding portion 85-002. The data holding portion 85-002 latches the pieces of image data at a timing when the data latch signal we002 is input from the data holding portion 85-001, and generates drive signals (P002[1] to P002[4]). In addition, the data holding portion 85-002 delays the data latch signal we002 by one clock pulse and transmits the delayed data latch signal to the data holding portion 85-003 as a data latch signal we003.

In this manner, the data holding portion 85 (-001 to 748) sequentially latches the pieces of image data while transmitting the data latch signal up to the 748-th data holding portion 85. Then, once the image data is latched, the data holding portion 85 (-001 to 748) transmits the latched signal to the analog portion 86 as the drive signal. In the present embodiment, since pieces of image data for four lines are latched by one data latch signal, drive signals for four lines (four pixels) are simultaneously output.

<Analog Portion>

Next, a configuration of the analog portion 86 will be described. The analog portion 86 includes a drive circuit connected to each of the light emitting portions 50 on a one-to-one basis. Hereinafter, for convenience of description, one drive circuit will be described, but it is assumed that the same number of drive circuits as the number of light emitting portions 50, that is, 2992 drive circuits (748×4 rows) exist.

Figure 12:
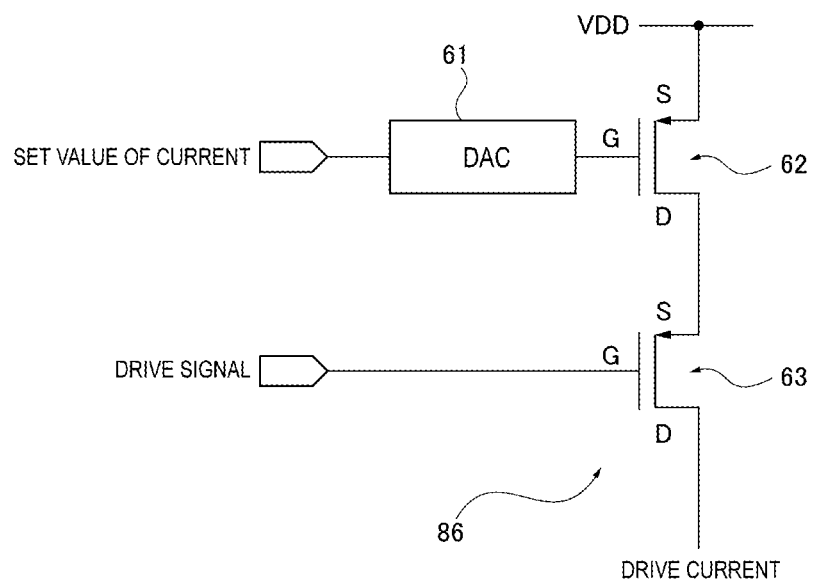
FIG. 12 is a circuit diagram of an analog portion.

FIG. 12 is a circuit diagram of the analog portion 86. As illustrated in FIG. 12, the analog portion 86 includes a current setting DAC 61, a current control MOSFET 62, and a switching MOSFET 63. The DAC 61 receives a set value of a current flowing from the register portion 82 of the digital portion 80 to the light emitting portion 50 as a digital value, converts the set value of the current into an analog voltage, and outputs the analog voltage.

The current control MOSFET 62 is a Pch MOSFET, has a source terminal connected to a power supply voltage VDD, and has a gate terminal connected to an output of the DAC 61. Further, a current flowing from the source to a drain increases as the analog voltage input from the DAC 61 increases.

The switching MOSFET 63 is a Pch MOSFET, has a source terminal connected to a drain terminal of the current control MOSFET 62, and has a gate terminal to which the drive signal output from the data holding portion 85 is input. The drive signal is a binary signal indicating a high level and a low level, and when the high level is input, the MOSFET 63 is turned on, and a current controlled by the current control MOSFET 62 flows from the source to the drain. Since the drain terminal is connected to an anode terminal of the light emitting portion 50, the current becomes a drive current for the light emitting portion 50. In the present embodiment, since drive currents for four lines (for four pixels) are simultaneously output, the light emitting portions 50 for four lines (for four pixels) simultaneously emit light.

<Lighting Control of Light Emitting Portion at Time of Image Formation>

Next, lighting control of the light emitting portion 50 at the time of image formation will be described. In the following description, the light emission of the light emitting portion 50 means that the light emitting portion 50 emits light of a light quantity enough to change a charging potential of the photosensitive drum 1 to the extent of being developed by toner. That is, the light emission of the light emitting portion 50 does not include a case where the light emitting portion 50 emits light of a light quantity enough to change the charging potential of the photosensitive drum 1 to such an extent that a toner image is not developed as a visible image.

Figure 13:
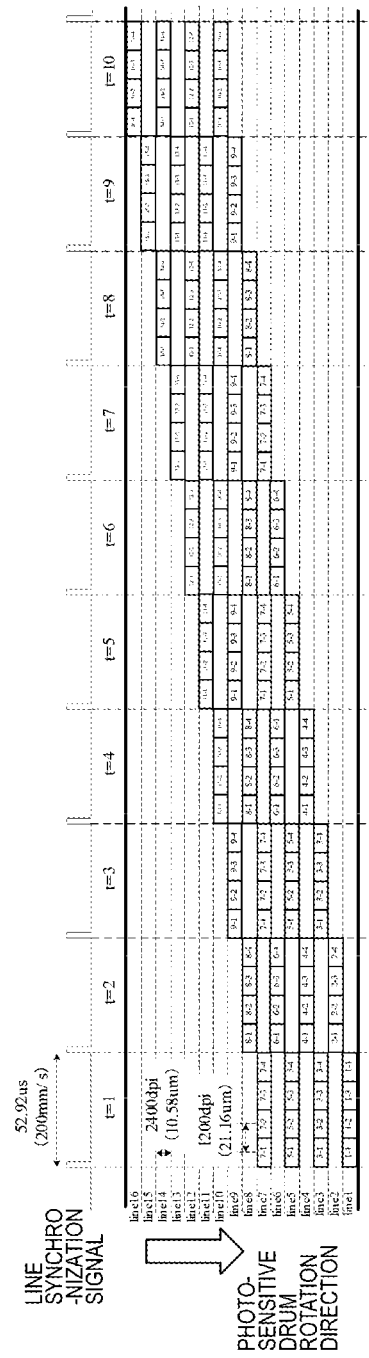
FIG. 13 is a diagram illustrating an exposure image of the photosensitive drum.

FIG. 13 is a diagram illustrating an exposure image of the photosensitive drum 1. In FIG. 13, a rectangle on the photosensitive drum 1 indicates a pixel on the photosensitive drum 1, and a number (1-1 to 16-4) in the pixel indicates a type of image data to be written in each pixel. Although the number of pixels in the arrow X direction is 748 pixels×20 chips=14960 pixels, only four pixels are illustrated as the pixels in the arrow X direction in FIG. 13 for convenience of description.

As illustrated in FIG. 13, first, at time T1, pieces of image data for four lines are transmitted from the image controller portion 70 to the exposure head 6. As a result, four light emitting portions 50 arranged in parallel in the arrow Y direction simultaneously emit light, and pixels (1-1, 3-1, 5-1, and 7-1) for four lines are simultaneously exposed on the photosensitive drum 1.

One clock pulse later, pieces of image data for the next four lines are transmitted from the image controller portion 70 to the exposure head 6. As a result, four light emitting portions 50 adjacent to the four light emitting portions 50 that initially emit light in the arrow X direction simultaneously emit light, and pixels (1-2, 3-2, 5-2, and 7-2) for four lines adjacent to each other in the arrow X direction are simultaneously exposed on the photosensitive drum 1.

By repeating this operation every clock pulse, pixels for 2400 dpi×4 lines are exposed on the photosensitive drum 1 during 52.92 us which is the cycle of the line synchronization signal. Here, at time T1, pieces of image data (1-1 to 1-4) for exposing the first line of the photosensitive drum 1 are transmitted to the light emitting portions 50 positioned most downstream in the rotation direction of the photosensitive drum 1. On the other hand, in the present embodiment, since the resolution pitch of the light emitting element array chip 40 is 1200 dpi (about 21.16 μm) with respect to the image resolution of 2400 dpi in the sub-scanning direction, pieces of image data spaced by one line of 2400 dpi are transmitted to the light emitting portions 50 positioned upstream of the light emitting portions 50 to which the pieces of image data for exposing the first line are transmitted, in the rotation direction of the photosensitive drum 1. For example, pieces of image data (3-1 to 3-4) for exposing the third line of the photosensitive drum 1 are transmitted to the light emitting portions 50 positioned upstream of the light emitting portion 50 for exposing the first line. Similarly, pieces of image data (5-1 to 5-4) and pieces of image data (7-1 to 7-4) are transmitted to the light emitting portions 50 positioned further upstream. That is, images formed on the photosensitive drum 1 at time T1 are spaced by one line of 2400 dpi as illustrated in FIG. 1.

Next, at time T2 when the photosensitive drum 1 is rotated for one line (10.58 um) of 2400 dpi in the sub-scanning direction (arrow Y direction) with respect to time T1, pieces of image data for four lines are transmitted from the image controller portion 70 to the exposure head 6 in the same manner as time T1. Here, the pieces of image data transmitted to each line of the light emitting portions 50 at time T2 are transmitted while being shifted by one line with respect to time T1.

That is, at time T2, pieces of image data (2-1 to 2-4) for exposing the second line of the photosensitive drum 1 are transmitted to the light emitting portions 50 positioned most downstream in the rotation direction of the photosensitive drum 1. Further, pieces of image data (4-1 to 4-4) for exposing the fourth line of the photosensitive drum 1 spaced by one line of 2400 dpi are transmitted to the light emitting portions 50 positioned upstream of the light emitting portions 50 to which the pieces of image data for exposing the second line are transmitted, in the rotation direction of the photosensitive drum 1. Similarly, each of pieces of image data (6-1 to 6-4) and pieces of image data (8-1 to 8-4) are transmitted to the light emitting portions 50 adjacent in the rotation direction of the photosensitive drum 1 for each line.

Further, at time T3 when the photosensitive drum 1 is rotated for one line (10.58 um) of 2400 dpi in the sub-scanning direction (arrow Y direction) with respect to time T2, pieces of image data for four lines are transmitted from the image controller portion 70 to the exposure head 6 in the same manner as times T1 and T2. Here, the pieces of image data transmitted to each line of the light emitting portions 50 at time T3 are transmitted while being shifted by one line with respect to time T2.

That is, at time T3, pieces of image data (3-1 to 3-4) for exposing the third line of the photosensitive drum 1 are transmitted to the light emitting portions 50 positioned most downstream in the rotation direction of the photosensitive drum 1. Further, pieces of image data (5-1 to 5-4) for exposing the fifth line of the photosensitive drum 1 spaced by one line of 2400 dpi are transmitted to the light emitting portions 50 positioned upstream of the light emitting portions 50 to which the pieces of image data for exposing the third line are transmitted, in the rotation direction of the photosensitive drum 1. Similarly, each of pieces of image data (7-1 to 7-4) and pieces of image data (9-1 to 9-4) are transmitted to the light emitting portions 50 adjacent in the rotation direction of the photosensitive drum 1 for each line.

Therefore, for the third line, the fifth line, and the seventh line of the photosensitive drum 1, the light emitting portions 50 perform multiple exposure twice at time T1 and time T3. That is, one pixel is formed by the plurality of light emitting portions 50 that perform multiple exposure. Thereafter, even after time T4, the same processing as time T1, time T2, and time T3 is executed. As a result, at a time point of time T7, since the exposure processing is executed at each of time T1 to time T7 for the seventh line on the photosensitive drum 1, multiple exposure is performed four times in total. By repeating this operation for one image page, an electrostatic latent image subjected to multiple exposure four times is formed over the entire region of the photosensitive drum 1 except for the first to sixth lines.

As described above, in the present embodiment, the pitch of the light emitting portions 50 of the exposure head 6 in the sub-scanning direction is an integer multiple of the resolution pitch in the sub-scanning direction (the rotation direction of the photosensitive drum 1 or the arrow Y direction) of the image formed by the image forming apparatus A. With such a configuration, it is possible to perform multiple exposure of the photosensitive drum 1 only by shifting the image data exposed by the light emitting portions 50 arranged in parallel in the arrow Y direction without shifting the light emission timings of the light emitting portions 50 arranged in parallel in the arrow Y direction by providing a delay circuit in the exposure head 6. Therefore, an increase in circuit scale of the exposure head 6 can be suppressed, and the manufacturing cost can be reduced.

In the present embodiment, a configuration in which the photosensitive drum 1 is driven at a rotation speed of 200 mm/s has been described, but the present invention is not limited thereto. An optimum image forming condition varies depending on the type of the sheet S and the like. For example, in a case where the toner image is fixed to thick paper or coated paper in the fixing device 94, a larger amount of heat is required than in a case where the toner image is fixed to plain paper. Therefore, it is preferable to decrease a conveyance speed for the sheet S to increase the fixing time. Therefore, in the following, a case where the photosensitive drum 1 is driven at a rotation speed of 100 mm/s in order to decrease the conveyance speed for the sheet S will be considered.

Figure 14:
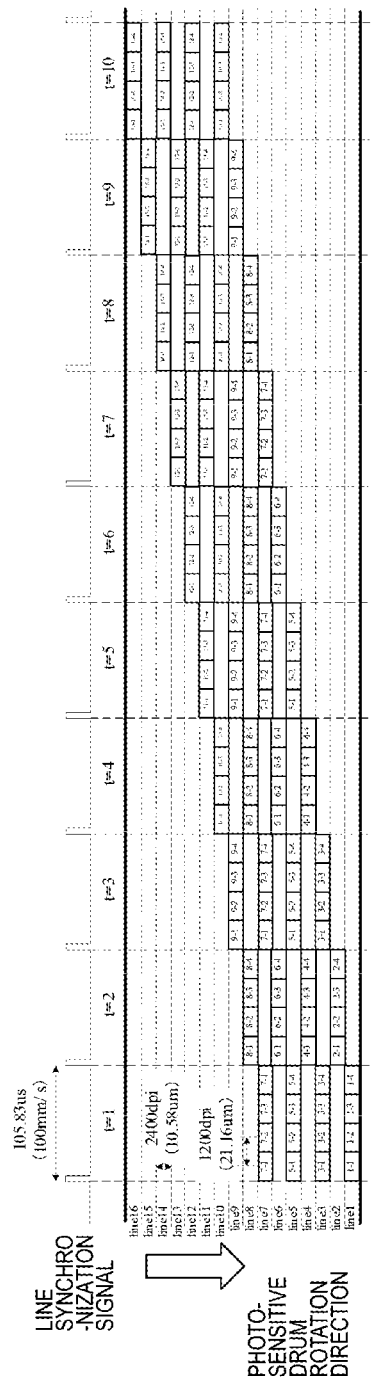
FIG. 14 is a diagram illustrating an exposure image of the photosensitive drum.

In a case where the photosensitive drum 1 is driven at a rotation speed of 100 mm/s, a time taken to perform exposure at a resolution of 2400 dpi (10.58 um) is 211.66 us. Therefore, as illustrated in FIG. 14, the photosensitive drum 1 is driven at a rotation speed of 100 mm/s, and the cycle of the line synchronization signal is set to 105.83 us. The light emission order of the light emitting portions 50 of the exposure head 6 and image data to be written for each line are controlled similarly to the control described above with reference to FIG. 13.

In this configuration, since the rotation speed of the photosensitive drum 1 is 100 mm/s, which is a half of that in the configuration described with reference to FIG. 13, an exposure time for 2400 dpi (10.58 um) is doubled. Therefore, in a case where the light emitting portion 50 is driven with the same drive current as that in the configuration in which the rotation speed of the photosensitive drum 1 is 200 mm/s, the photosensitive drum 1 is exposed with twice the intensity. Therefore, it is preferable to adjust the exposure intensity by changing the set value of the current setting DAC 61 according to the rotation speed of the photosensitive drum 1. For example, in a configuration in which the rotation speed of the photosensitive drum 1 is 100 mm/s, it is preferable that the set value of the current of the DAC 61 is set to a half of that in a configuration in which the rotation speed of the photosensitive drum 1 is 200 mm/s, and the exposure intensities are equivalent to each other.

Figure 15:
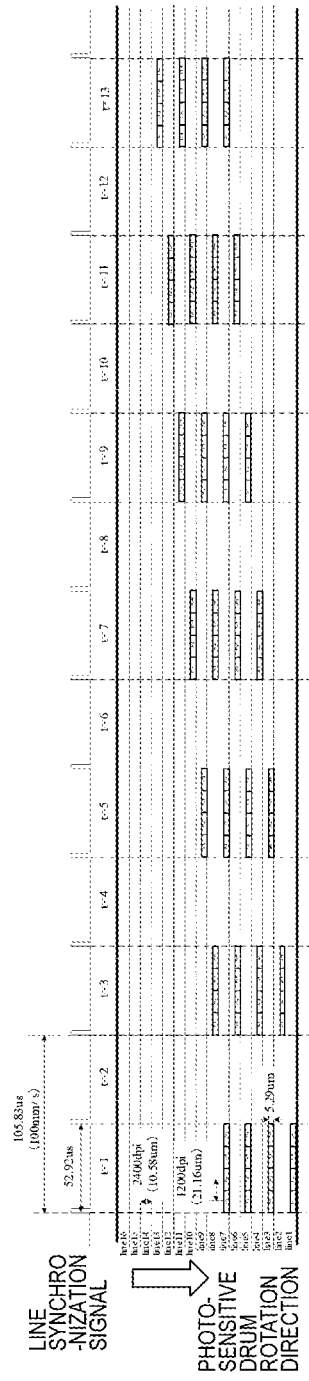
FIG. 15 is a diagram illustrating an exposure image of the photosensitive drum.

Furthermore, in a configuration in which the photosensitive drum 1 is driven at a rotation speed of 100 mm/s, the following configuration can be considered as a configuration in which the exposure intensity is equivalent to that in a configuration in which the photosensitive drum 1 is driven at a rotation speed of 200 mm/s without changing the set value of the current of the DAC 61. As illustrated in FIG. 15, first, the photosensitive drum 1 is driven at a rotation speed of 100 mm/s, and the cycle of the line synchronization signal is set to 52.92 us without being changed from that in a configuration in which the photosensitive drum 1 is driven at a rotation speed of 200 mm/s.

Then, at time T1, the light emitting portions 50 are controlled by the same control as the control of the light emitting portions 50 at time T1 described with reference to FIG. 13, and the pixels for 2400 dpi×4 lines spaced by one line are exposed on the photosensitive drum 1 during 52.92 us which is the cycle of the line synchronization signal. Here, although the photosensitive drum 1 rotates at 100 mm/s, since the cycle of the line synchronization signal is 52.92 us corresponding to 200 mm/s, a length of a region exposed on the photosensitive drum 1 in the arrow Y direction at time T1 is 5.29 um, which is half of 10.58 um.

Next, at time T2 when the photosensitive drum 1 rotates by 5.29 um with respect to time T1, image data transmission from the image controller portion 70 to the exposure head 6 is not performed, and exposure of the photosensitive drum 1 is not performed. Next, at time T3 when the photosensitive drum 1 rotates by 10.58 um (for one line of 2400 dpi) with respect to time T1, the light emitting portions 50 are caused to emit light under the same control as the control of the light emitting portions 50 at time T2 described with reference to FIG. 13.

Therefore, for the seventh line of the photosensitive drum 1, the light emitting portions 50 perform multiple exposure twice at time T1 and time T5. Thereafter, the same control is performed until time T13. That is, while the line synchronization signal is output twice, the image data is not transmitted once (the image data is thinned out), and the light emitting portions 50 are turned off (does not emit light). As a result, at a time point of time T13, since the exposure processing is executed at each of times T1, T5, T9, and T13 for the seventh line on the photosensitive drum 1, multiple exposure is performed four times in total. By repeating this operation, an electrostatic latent image subjected to multiple exposure four times is formed over the entire region of the photosensitive drum 1 except for the first to third lines.

By performing such control, in a configuration in which the photosensitive drum 1 is driven at a rotation speed of 100 mm/s, the exposure time for each line can be made the same as that in a configuration in which the photosensitive drum 1 is driven at a rotation speed of 200 mm/s. Accordingly, the exposure intensity can be made equivalent without changing the set value of the current of the DAC 61. In this configuration, the length of the exposure region for each line on the photosensitive drum 1 in the sub-scanning direction (arrow Y direction) is halved. However, since the resolution of the image is not halved, and only a spot diameter in the sub-scanning direction is reduced, there is no adverse effect on the image, and the sharpness of the image is improved.

Second Embodiment

Next, a second embodiment of an image forming apparatus A according to the present invention will be described. The same portions as those in the first embodiment will be denoted by the same reference signs with reference to the same drawings, and a description thereof is omitted.

Figure 16:
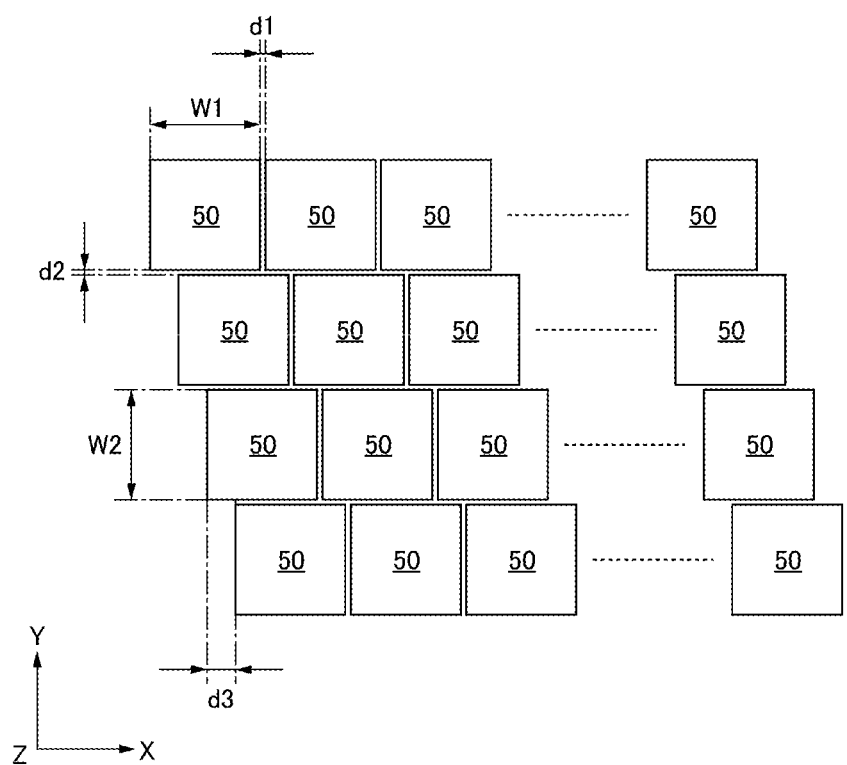
FIG. 16 is a schematic diagram for explaining a configuration of the light emitting portion.

FIG. 16 is a schematic diagram for explaining a configuration of a light emitting portion 50 of a light emitting element array chip 40 according to the present embodiment. As illustrated in FIG. 16, the configuration of the present embodiment is a configuration in which the light emitting portions 50 adjacent to each other in the arrow Y direction are arranged to be shifted in position by an interval d3 in the arrow X direction. In the present embodiment, the interval d3 is set to 5.29 μm (4800 dpi).

Widths W1 and W2 and intervals d1 and d2 are W1=W2=19.8 um and d1=d2=0.68 um as in the first embodiment. That is, a pitch of the light emitting portions 50 in the arrow Y direction is set to 21.16 um (1200 dpi) as in the first embodiment. The image forming apparatus A according to the present embodiment forms an image with a resolution of 2400 dpi in the sub-scanning direction, and the rotation speed of a photosensitive drum 1 is 200 mm/s. Therefore, a time taken to perform exposure at a resolution of 2400 dpi (10.58 um) is 52.92 us, and a cycle of a line synchronization signal is also 52.92 us. Other configurations of the image forming apparatus A of the present embodiment are similar to those of the first embodiment except for control described below.

Figure 17:
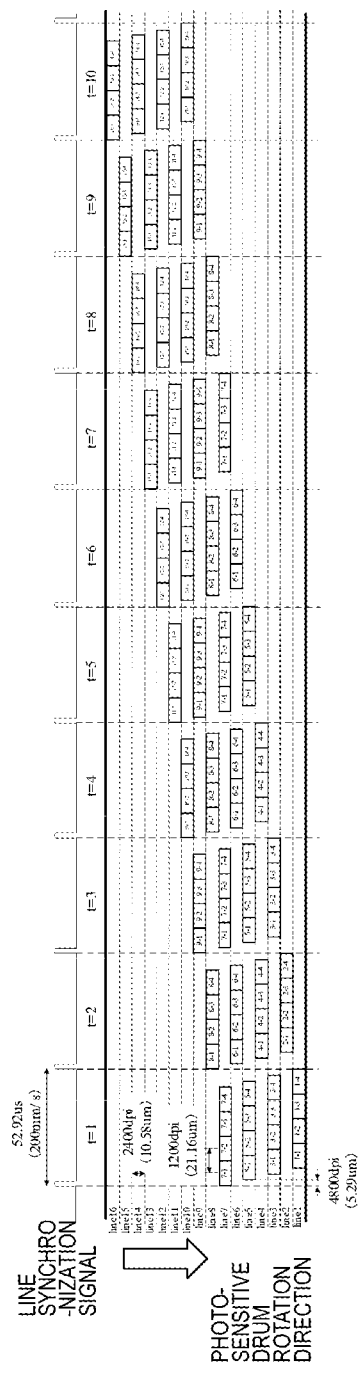
FIG. 17 is a diagram illustrating an exposure image of the photosensitive drum.

FIG. 17 is a diagram illustrating an exposure image of the photosensitive drum 1. In FIG. 17, a rectangle on the photosensitive drum 1 indicates a pixel on the photosensitive drum 1, and a number (1-1 to 16-4) in the pixel indicates a type of image data to be written in each pixel. Although the number of pixels in the arrow X direction is 748 pixels×20 chips=14960 pixels, only four pixels are illustrated as the pixels in the arrow X direction in FIG. 17 for convenience of description.

As illustrated in FIG. 17, first, at time T1, the light emitting portions 50 are controlled by the same control as the control of the light emitting portions 50 at time T1 described with reference to FIG. 13, and the pixels for 2400 dpi×4 lines spaced by one line are exposed on the photosensitive drum 1 during 52.92 us which is the cycle of the line synchronization signal.

Next, at time T2 when the photosensitive drum 1 is rotated for one line (10.58 um) of 2400 dpi in the sub-scanning direction (arrow Y direction) with respect to time T1, pieces of image data for four lines are transmitted from the image controller portion 70 to the exposure head 6 in the same manner as time T1. Here, the pieces of image data transmitted to each line of the light emitting portions 50 at time T2 are transmitted while being shifted by one line with respect to time T1.

That is, at time T2, pieces of image data (2-1 to 2-4) for exposing the second line of the photosensitive drum 1 are transmitted to the light emitting portions 50 positioned most downstream in the rotation direction of the photosensitive drum 1. Further, pieces of image data (4-1 to 4-4) for exposing the fourth line spaced by one line of 2400 dpi in the photosensitive drum 1 are transmitted to the light emitting portions 50 positioned upstream of the light emitting portions 50 to which the pieces of image data for exposing the second line are transmitted, in the rotation direction of the photosensitive drum 1. Similarly, pieces of image data (5-1 to 5-4) and pieces of image data (7-1 to 7-4) are transmitted to the light emitting portions 50 positioned further upstream. That is, images formed on the photosensitive drum 1 at time T1 are spaced by one line of 2400 dpi as illustrated in FIG. 1.

Further, at time T3 when the photosensitive drum 1 is rotated for one line (10.58 um) of 2400 dpi in the sub-scanning direction (arrow Y direction) with respect to time T2, pieces of image data for four lines are transmitted from the image controller portion 70 to the exposure head 6 in the same manner as times T1 and T2. Here, the pieces of image data transmitted to each line of the light emitting portions 50 at time T3 are transmitted while being shifted by one line with respect to time T2.

That is, at time T3, pieces of image data (3-1 to 3-4) for exposing the third line of the photosensitive drum 1 are transmitted to the light emitting portions 50 positioned most downstream in the rotation direction of the photosensitive drum 1. Further, pieces of image data (5-1 to 5-4) for exposing the fifth line of the photosensitive drum 1 spaced by one line of 2400 dpi are transmitted to the light emitting portions 50 positioned upstream of the light emitting portions 50 to which the pieces of image data for exposing the third line are transmitted, in the rotation direction of the photosensitive drum 1. Similarly, each of pieces of image data (7-1 to 7-4) and pieces of image data (9-1 to 9-4) are transmitted to the light emitting portions 50 adjacent in the rotation direction of the photosensitive drum 1 for each line.

Therefore, for the third line, the fifth line, and the seventh line of the photosensitive drum 1, the light emitting portions 50 perform multiple exposure twice at time T1 and time T3. Thereafter, even after time T4, the same processing as time T1, time T2, and time T3 is executed. As a result, at a time point of time T7, since the exposure processing is executed at each of time T1 to time T7 for the seventh line on the photosensitive drum 1, multiple exposure is performed four times in total. By repeating this operation for one image page, an electrostatic latent image subjected to multiple exposure four times is formed over the entire region of the photosensitive drum 1 except for the first to sixth lines.

Also in the present embodiment, the pitch of the light emitting portions 50 of the exposure head 6 in the sub-scanning direction is an integer multiple of a resolution pitch in the sub-scanning direction (the rotation direction of the photosensitive drum 1 or the arrow Y direction) of the image formed by the image forming apparatus A. Therefore, similarly to the first embodiment, the photosensitive drum 1 can be subjected to multiple exposure without providing a delay circuit in the exposure head 6 and shifting light emission timings of the light emitting portions 50 arranged in parallel in the arrow Y direction. Therefore, an increase in circuit scale of the exposure head 6 can be suppressed, and the manufacturing cost can be reduced.

In the present embodiment, the light emitting portions 50 adjacent to each other in the arrow Y direction are arranged to be shifted in position by 5.29 μm (4800 dpi) in the arrow X direction. Therefore, exposure positions of the light emitting portions 50 adjacent to each other in the arrow Y direction on the photosensitive drum 1 are shifted by 5.29 um in the main scanning direction (the arrow X direction), and the resolution of the exposure in the main scanning direction is 4800 dpi. Therefore, with the configuration of the present embodiment, the resolution of exposure can be improved as compared with the configuration of the first embodiment, and the image quality can be improved.

Third Embodiment

Next, a third embodiment of an image forming apparatus A according to the present invention will be described. The same portions as those in the first and second embodiments will be denoted by the same reference signs with reference to the same drawings, and a description thereof is omitted.

Figure 18:
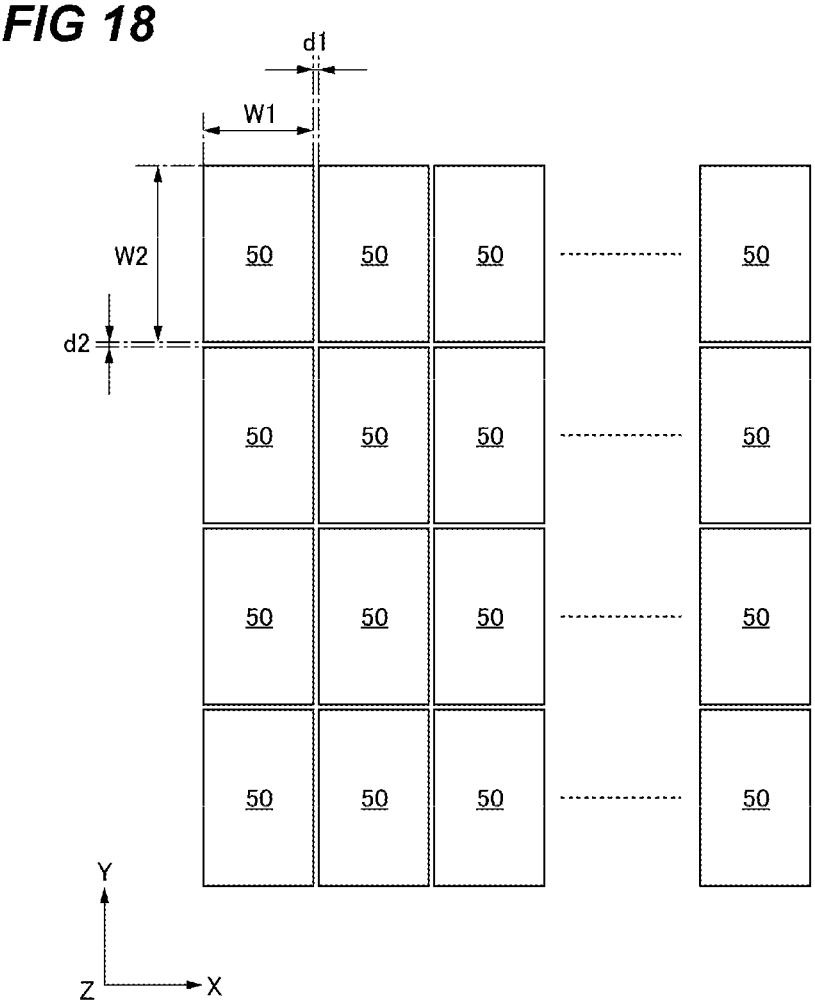
FIG. 18 is a schematic diagram for explaining a configuration of the light emitting portion.

FIG. 18 is a schematic diagram for explaining a configuration of a light emitting portion 50 of a light emitting element array chip 40 according to the present embodiment. As illustrated in FIG. 18, in the present embodiment, in order to increase a light intensity of the light emitting portion 50, a width W2 of the light emitting portion 50 is set to W2=31.07 μm, which is larger than the width W2 in the first embodiment. A width W1 and intervals d1 and d2 are W1=19.8 um and d1=d2=0.68 um as in the first embodiment. That is, in the present embodiment, a pitch of the light emitting portions 50 in the arrow Y direction is set to 31.75 um (800 dpi).

The image forming apparatus A according to the present embodiment forms an image with a resolution of 2400 dpi in the sub-scanning direction, and the rotation speed of a photosensitive drum 1 is 200 mm/s as in the first embodiment. Therefore, a time taken to perform exposure at a resolution of 2400 dpi (10.58 um) is 52.92 us, and a cycle of a line synchronization signal is also 52.92 us. Other configurations of the image forming apparatus A of the present embodiment are similar to those of the first embodiment except for control described below.

Figure 19:
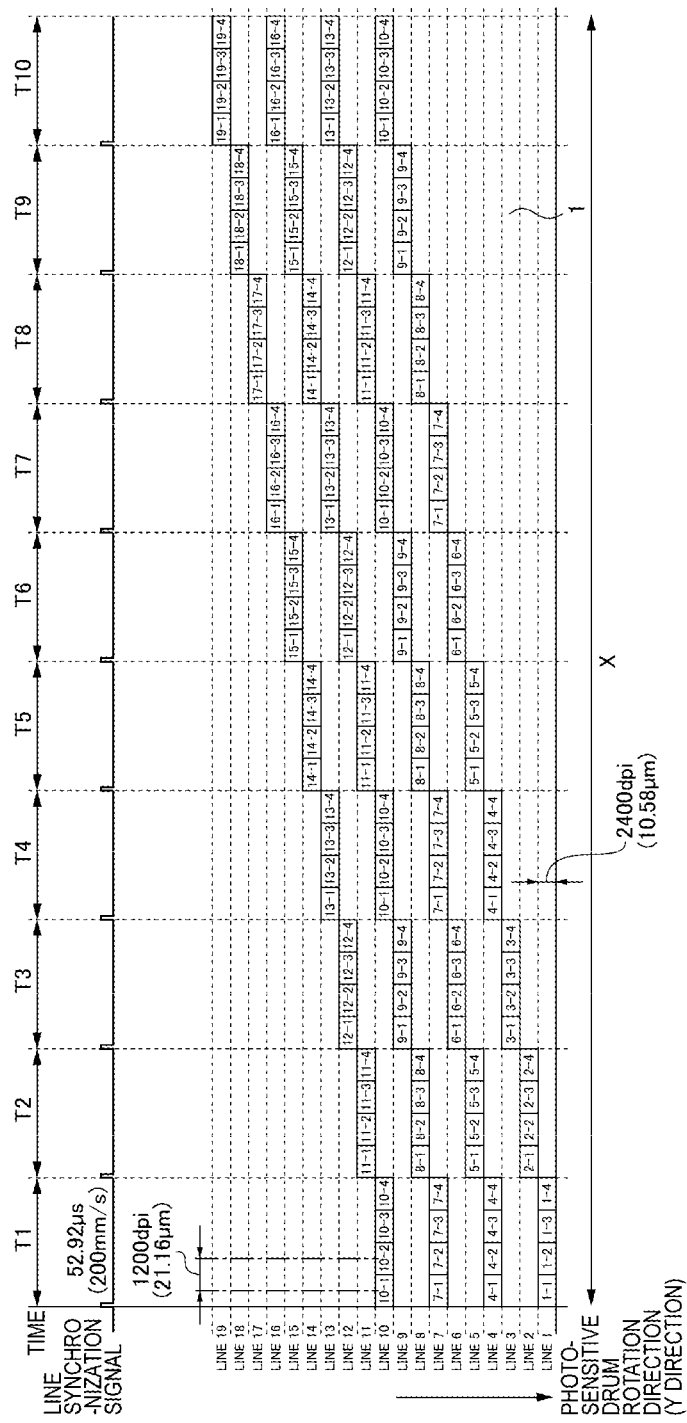
FIG. 19 is a diagram illustrating an exposure image of the photosensitive drum.

FIG. 19 is a diagram illustrating an exposure image of the photosensitive drum 1. In FIG. 17, a rectangle on the photosensitive drum 1 indicates a pixel on the photosensitive drum 1, and a number (1-1 to 7-4) in the pixel indicates a type of image data to be written in each pixel. Although the number of pixels in the arrow X direction is 748 pixels×20 chips=14960 pixels, only four pixels are illustrated as the pixels in the arrow X direction in FIG. 19 for convenience of description.

As illustrated in FIG. 19, first, at time T1, the light emitting portions 50 are controlled by the same control as the control of the light emitting portions 50 at time T1 described with reference to FIG. 13, and the pixels for 1200 dpi×4 lines are exposed on the photosensitive drum 1 during 52.92 us which is the cycle of the line synchronization signal. In the present embodiment, since an image with a resolution of 2400 dpi in the sub-scanning direction (arrow Y direction) is formed by the image forming apparatus A and an interval between the light emitting portions 50 in the sub-scanning direction is 800 dpi, electrostatic latent images spaced by two lines of 2400 dpi at time T1 are formed on the photosensitive drum 1.

Next, at time T2 when the photosensitive drum 1 is rotated for one line (10.58 um) of 2400 dpi in the sub-scanning direction (arrow Y direction) with respect to time T1, pieces of image data for four lines are transmitted from the image controller portion 70 to the exposure head 6 in the same manner as time T1. Here, the pieces of image data transmitted to each line of the light emitting portions 50 at time T2 are transmitted while being shifted by one line with respect to time T1.

That is, at time T2, pieces of image data (2-1 to 2-4) for exposing the second line of the photosensitive drum 1 are transmitted to the light emitting portions 50 positioned most downstream in the rotation direction of the photosensitive drum 1. Further, pieces of image data (5-1 to 5-4) for exposing the fifth line of the photosensitive drum 1 are transmitted to the light emitting portions 50 positioned upstream of the light emitting portions 50 to which the pieces of image data for exposing the second line are transmitted, in the rotation direction of the photosensitive drum 1. Each of pieces of image data (8-1 to 8-4) and pieces of image data (11-1 to 11-4) are transmitted to the light emitting portions 50 adjacent in the rotation direction of the photosensitive drum 1. As described above, at time T2, each line on the photosensitive drum 1 is not subjected to multiple exposure.

Next, at times T3 and T4, control similar to that at times T1 and T2 is performed. Therefore, at a time point of time T4, for the fourth line, the seventh line, and the tenth line of the photosensitive drum 1, the light emitting portions 50 perform multiple exposure twice at time T1 and time T4. At times T5 and T6, control similar to that at times T3 and T4 is performed. Therefore, at a time point of time T5, for the fifth line, the eighth line, and the eleventh line of the photosensitive drum 1, the light emitting portions 50 perform multiple exposure twice at time T2 and time T5. At a time point of time T6, for the sixth line, the ninth line, and the twelfth line of the photosensitive drum 1, the light emitting portions 50 perform multiple exposure twice at time T3 and time T6.

Thereafter, at time T7, pieces of image data for four lines are transmitted from the image controller portion 70 to the exposure head 6 in the same manner as at time T1. Here, the pieces of image data transmitted to each line of the light emitting portions 50 at time T7 are transmitted while being shifted by one line with respect to time T6. As a result, at a time point of time T7, since the exposure processing is executed at each of times T1, T4, T7, and T10 for the tenth line on the photosensitive drum 1, multiple exposure is performed four times in total. By repeating this operation for one image page, an electrostatic latent image subjected to multiple exposure four times is formed over the entire region of the photosensitive drum 1 except for the first to ninth lines. Although multiple exposure is not performed for the first to third lines on the photosensitive drum 1, multiple exposure is performed at least twice or more for the fourth to ninth lines.

As described above, in the present embodiment, the pitch of the light emitting portions 50 of the exposure head 6 in the sub-scanning direction is an integer multiple of the resolution in the sub-scanning direction (the rotation direction of the photosensitive drum 1 or the arrow Y direction) of the image formed by the image forming apparatus A. Also with such a configuration, it is possible to perform multiple exposure of the photosensitive drum 1 only by shifting the image data exposed by the light emitting portions 50 arranged in parallel in the arrow Y direction without shifting the light emission timings of the light emitting portions 50 arranged in parallel in the arrow Y direction by providing a delay circuit in the exposure head 6. As a result, an increase in circuit scale of the exposure head 6 can be suppressed, and the manufacturing cost can be reduced.

In the first embodiment and the second embodiment, a configuration in which the resolution of the image formed by the image forming apparatus A in the sub-scanning direction (arrow Y direction) is 2400 dpi, and the pitch of the light emitting portions 50 in the sub-scanning direction (arrow Y direction) is 1200 dpi has been described. Further, in the third embodiment, a configuration in which the resolution of the image formed by the image forming apparatus A in the sub-scanning direction (arrow Y direction) is 2400 dpi, and the pitch of the light emitting portions 50 in the sub-scanning direction (arrow Y direction) is 800 dpi has been described. However, the present invention is not limited thereto. That is, if the pitch of the light emitting portions 50 of the exposure head 6 in the sub-scanning direction is an integer multiple of the resolution of the image formed by the image forming apparatus A in the sub-scanning direction (the rotation direction of the photosensitive drum 1 and the arrow Y direction), excluding an equal multiple, the resolution of the image in the sub-scanning direction and the pitch of the light emitting portions 50 in the sub-scanning direction may be freely set.

Although the present invention has been described with reference to the exemplary embodiments, the present invention is not limited to the disclosed exemplary embodiments. The following claims are given the broadest interpretation to encompass all modifications, equivalent structures and functions.

What is claimed is:

1. An image forming apparatus configured to expose a surface of a photosensitive member with light to form an electrostatic latent image, and attach toner to the electrostatic latent image to form an image, the image forming apparatus comprising:

an exposure head configured to expose the surface of the photosensitive member with light to form the electrostatic latent image and including a light emitting portion that includes a substrate, a first electrode layer including a plurality of electrodes that are two-dimensionally arranged in a rotation direction of the photosensitive member and a rotational axis direction of the photosensitive member and are arranged on the substrate at intervals, a light emitting layer stacked on the first electrode layer and configured to emit light when a voltage is applied, and a second electrode layer arranged on a side opposite to a side where the first electrode layer is arranged with respect to the light emitting layer and through which light is transmissible; and a controller configured to control application of a voltage to each of the plurality of electrodes included in the first electrode layer based on image data in such a way that the light emitting layer emits light and configured to control the voltage applied to each of the plurality of electrodes based on the image data in such a way that one pixel is formed by controlling the voltage applied to the plurality of electrodes arranged at different positions in the rotation direction, wherein the plurality of electrodes are arranged in such a way that a pitch of the plurality of electrodes included in the first electrode layer in the rotation direction is an integer multiple of a resolution of the image formed by the image forming apparatus in the rotation direction, and the integer is greater than one.

2. The image forming apparatus according to claim 1, wherein the controller controls application of the voltage to the electrodes arranged in parallel in the rotation direction among the plurality of electrodes included in the first electrode layer in such a way that light emission or non-light emission of the light emitting portions arranged in parallel in the rotation direction is simultaneously performed according to image data.

3. The image forming apparatus according to claim 2, wherein a length of each of the electrodes included in the first electrode layer in the rotation direction is equal to a length in the rotational axis direction.

4. The image forming apparatus according to claim 2, wherein a length of each of the electrodes included in the first electrode layer in the rotation direction is longer than a length in the rotational axis direction.

5. The image forming apparatus according to claim 1, wherein the light emitting layer is an organic light emitting layer.

6. The image forming apparatus according to claim 1, wherein a length of each of the electrodes included in the first electrode layer in the rotation direction is equal to a length in the rotational axis direction.

7. The image forming apparatus according to claim 1, wherein a length of each of the electrodes included in the first electrode layer in the rotation direction is longer than a length in the rotational axis direction.

8. The image forming apparatus according to claim 1, wherein the one pixel in the image data is formed by a portion of the plurality of electrodes that differ in position in the rotation direction.

9. The image forming apparatus according to claim 1, wherein the one pixel in the image data is formed by irradiating the plurality of electrodes, each of which has a different position in the rotation direction, at the same location in the rotation direction on the surface of the photosensitive member in the rotational direction.

* * * * *